(12) United States Patent
Freda et al.

(10) Patent No.: US 12,279,174 B2
(45) Date of Patent: Apr. 15, 2025

(54) METHODS AND APPARATUS FOR LINK MANAGEMENT AND RECOVERY FOR SIDELINK RELAYS

(71) Applicant: InterDigital Patent Holdings, Inc., Wilmington, DE (US)

(72) Inventors: Martino Freda, Laval (CA); Jaya Rao, Montreal (CA); Tuong Hoang, Montreal (CA); Tao Deng, New York, NY (US); Ghyslain Pelletier, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 18/671,440

(22) Filed: May 22, 2024

(65) Prior Publication Data
US 2024/0314663 A1    Sep. 19, 2024

Related U.S. Application Data

(63) Continuation of application No. 18/019,496, filed as application No. PCT/US2021/044847 on Aug. 5, 2021.
(Continued)

(51) Int. Cl.
| | |
|---|---|
| *H04W 36/30* | (2009.01) |
| *H04W 36/00* | (2009.01) |
| *H04W 36/08* | (2009.01) |

(52) U.S. Cl.
CPC ....... *H04W 36/305* (2018.08); *H04W 36/033* (2023.05); *H04W 36/08* (2013.01); *H04W 36/302* (2023.05)

(58) Field of Classification Search
CPC ............ H04W 40/22; H04W 36/0079; H04W 36/033; H04W 36/08; H04W 36/302;
(Continued)

(56) References Cited

U.S. PATENT DOCUMENTS

2018/0139681 A1* 5/2018 Jung ................. H04W 56/0015
2019/0037625 A1* 1/2019 Shih .................... H04W 72/231
(Continued)

FOREIGN PATENT DOCUMENTS

| | | |
|---|---|---|
| EP | 3 273 745 | 1/2018 |
| EP | 3 618 391 | 3/2020 |
| WO | 2020/068991 | 4/2020 |

OTHER PUBLICATIONS

U.S. Appl. No. 62/884,365, Specification, Aug. 8, 2019 (Year: 2019).*
(Continued)

*Primary Examiner* — Ji-Hae Yea
(74) *Attorney, Agent, or Firm* — Volpe Koenig

(57) ABSTRACT

A method may include detecting a sidelink radio link failure and, in response, starting a first timer based on a first timer value associated with selection of a candidate node. The candidate node is a relay node or a network node. The relay node is selected for a connection reestablishment and configuration information is received that at least includes a second timer value associated with a second timer, which is associated with the connection reestablishment. The first timer is stopped upon selecting the candidate node. If the configuration information includes a third timer value associated with the connection reestablishment, the second timer is started using the third timer value upon selecting the candidate node. If the configuration information does not include the third timer value, the second timer is started (Continued)

using the second timer value upon selecting the candidate node. A reestablishment request message is then sent.

20 Claims, 8 Drawing Sheets

Related U.S. Application Data

(60) Provisional application No. 63/185,801, filed on May 7, 2021, provisional application No. 63/061,532, filed on Aug. 5, 2020.

(58) Field of Classification Search
CPC ... H04W 36/305; H04W 24/08; H04W 76/19; H04W 88/04; H04W 36/083; H04W 36/085; H04W 36/087; H04W 36/13; H04L 45/28

See application file for complete search history.

(56) References Cited

U.S. PATENT DOCUMENTS

| | | | |
|---|---|---|---|
| 2020/0029384 A1* | 1/2020 | Hong | H04W 36/305 |
| 2020/0045674 A1* | 2/2020 | Tseng | H04W 76/14 |
| 2020/0196205 A1* | 6/2020 | Kim | H04W 36/0033 |
| 2021/0045178 A1* | 2/2021 | Kung | H04W 76/18 |
| 2021/0211952 A1* | 7/2021 | Teyeb | H04W 36/305 |

OTHER PUBLICATIONS

U.S. Appl. No. 62/884,365, Drawings-only_black_and_white_line_drawings,Aug. 8, 2019 (Year: 2019).*

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHZ, IEEE Std 802.11ac-2013 (Dec. 11, 2013).

IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).

IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2020 (Dec. 3, 2020).

Interdigital Inc., "Connection Establishment and Maintenance for L2 Relays," 3GPP RAN WG2 Meeting #112 electronic, R2-2009203, Online (Nov. 2020).

Interdigital Inc., "Control Plane Procedures for L2 UE to NW Relays," 3GPP RAN WG2 Meeting #114 electronic, R2-2104871, Online (May 2021).

Oppo, "New SID: Study on NR sidelink relay," 3GPP TSG RAN Meeting #86, RP-193253, Sitges, Spain, (Dec. 9-12, 2019).

Third Generation Partnership Project, "Technical Specification Group Services and System Aspects; Study on system enhancement for Proximity based Services (ProSe) in the 5G System (5GS) (Release 17)," 3GPP TR 23.752 V0.6.0 (Nov. 2020).

Third Generation Partnership Project, "Technical Specification Group Services and System Aspects; Study on system enhancement for Proximity based Services (ProSe) in the 5G System (5GS) (Release 17)," 3GPP TR 23.752 V17.0.0 (Mar. 2021).

Third Generation Partnership Project, "Technical Specification Group Radio Access Network; Study on further enhancements to LTE Device to Device (D2D), User Equipment (UE) to network relays for Internet of Things (IOT) and wearables; (Release 15)," 3GPP TR 36.746 V15.1.1 (Apr. 2018).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 15)," 3GPP TS 36.300 V15.4.0 (Dec. 2018).

Third Generation Partnership Project, "Technical Specification Group Radio Access Network; NR; NR and NG-RAN Overall Description; Stage 2 (Release 16)," 3GPP TS 38.300 V16.1.0 (Mar. 2020).

Third Generation Partnership Project, "Technical Specification Group Radio Access Network; NR; NR and NG-RAN Overall Description; Stage 2 (Release 16)," 3GPP TS 38.300 V16.2.0 (Jul. 2020).

Third Generation Partnership Project, "Technical Specification Group Radio Access Network; NR; Radio Resource Control (RRC) protocol specification (Release 16)," 3GPP TS 38.331 V16.5.0 (Jun. 2021).

Third Generation Partnership Project, "Technical Specification Group Radio Access Network; NR; Radio Resource Control (RRC) protocol specification (Release 16)," 3GPP TS 38.331 V16.1.0 (Jul. 2020).

Third Generation Partnership Project, "Technical Specification Group Radio Access Network; NR; NR and NG-RAN Overall Description; Stage 2 (Release 16)," 3GPP TS 38.300 V16.6.0 (Jun. 2021).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 16)," 3GPP TS 36.300 V16.2.0 (Jul. 2020).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 16)," 3GPP TS 36.300 V16.6.0 (Jun. 2021).

Third Generation Partnership Project, "Technical Specification Group Radio Access Network; NR; Backhaul Adaptation Protocol (BAP) specification (Release 16)," 3GPP TS 38.340 V16.1.0 (Jul. 2020).

Third Generation Partnership Project, "Technical Specification Group Radio Access Network; NR; Backhaul Adaptation Protocol (BAP) specification (Release 16)," 3GPP TS 38.340 V16.5.0 (Jun. 2021).

Third Generation Partnership Project, "Technical Specification Group Radio Access Network; NR; Backhaul Adaptation Protocol (BAP) specification (Release 16)," 3GPP TS 38.340 V0.4.0 (Mar. 2020).

Third Generation Partnership Project, "Technical Specification Group Services and System Aspects; Study on system enhancement for Proximity based Services (ProSe) in the 5G System (5GS) (Release 17)," 3GPP TR 23.752 V0.4.0 (Jun. 2020).

ZTE, "Report of email discussion [106#81][NR/V2X] Slrb," 3GPP TSG-RAN WG2#107, R2-1909074, Prague, Czech Republic (Aug. 26-30, 2019).

* cited by examiner

METHODS AND APPARATUS FOR LINK MANAGEMENT AND RECOVERY FOR SIDELINK RELAYS

CROSS-REFERENCE TO RELATED APPLICATIONS

This application is a continuation of U.S. patent application Ser. No. 18/019,406 filed Feb. 3, 2023, which is the U.S. National Stage, under 35 U.S.C. § 371, of International Application No. PCT/US2021/044847 filed Aug. 5, 2021, which claims the benefit of U.S. Provisional Application No. 63/061,532, filed Aug. 5, 2020, and U.S. Provisional Application No. 63/185,801, filed May 7, 2021, the contents of which are incorporated herein by reference.

SUMMARY

A method may include detecting a sidelink radio link failure and, in response, starting a first timer based on a first timer value associated with selection of a candidate node. The candidate node is a relay node or a network node. The relay node is selected for a connection reestablishment and configuration information is received that at least includes a second timer value associated with a second timer, which is associated with the connection reestablishment. The first timer is stopped upon selecting the candidate node. If the configuration information includes a third timer value associated with the connection reestablishment, the second timer is started using the third timer value upon selecting the candidate node. If the configuration information does not include the third timer value, the second timer is started using the second timer value upon selecting the candidate node. A reestablishment request message is then sent.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
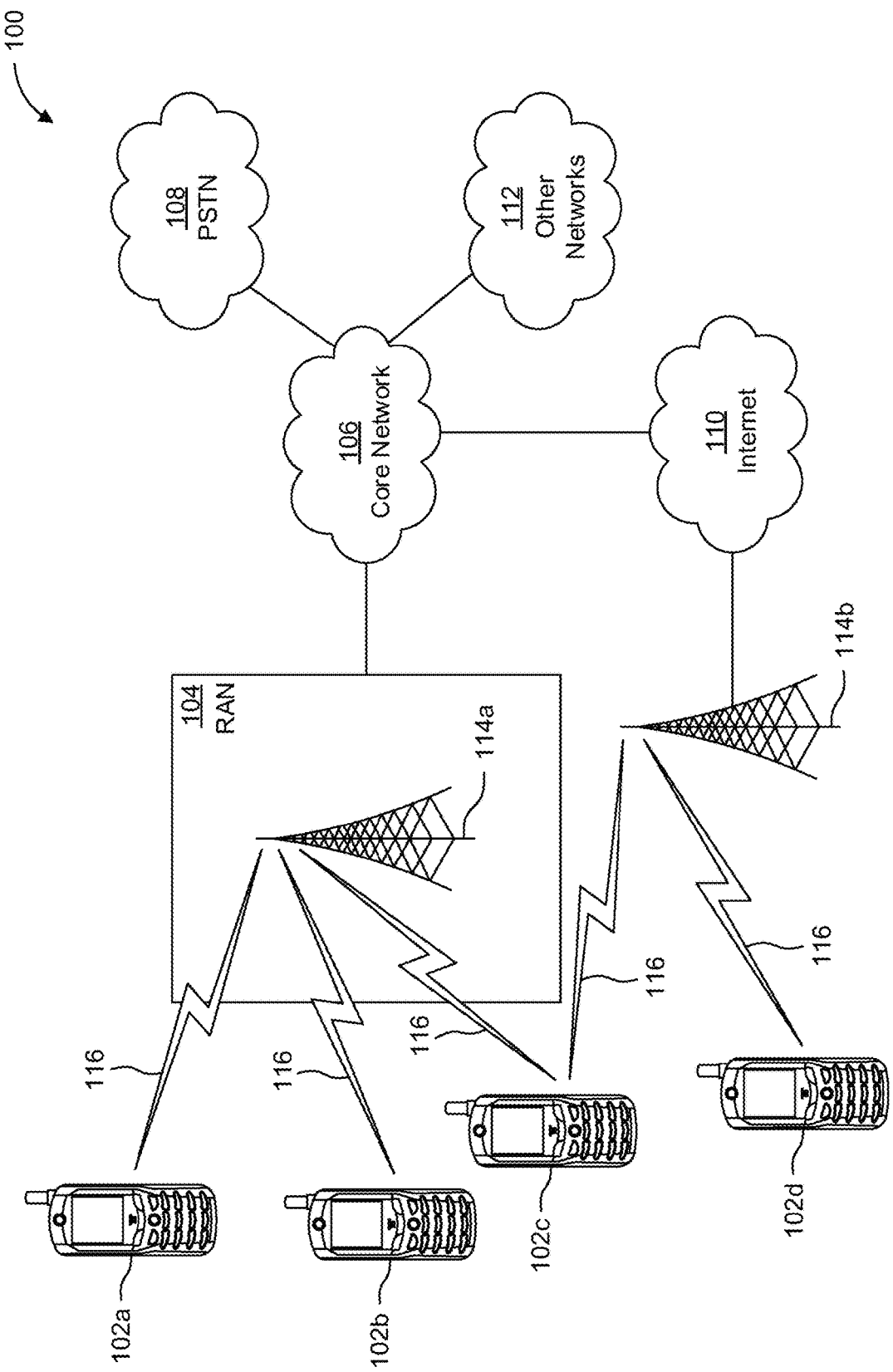
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (WTRU), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a WTRU.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi)), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QOS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
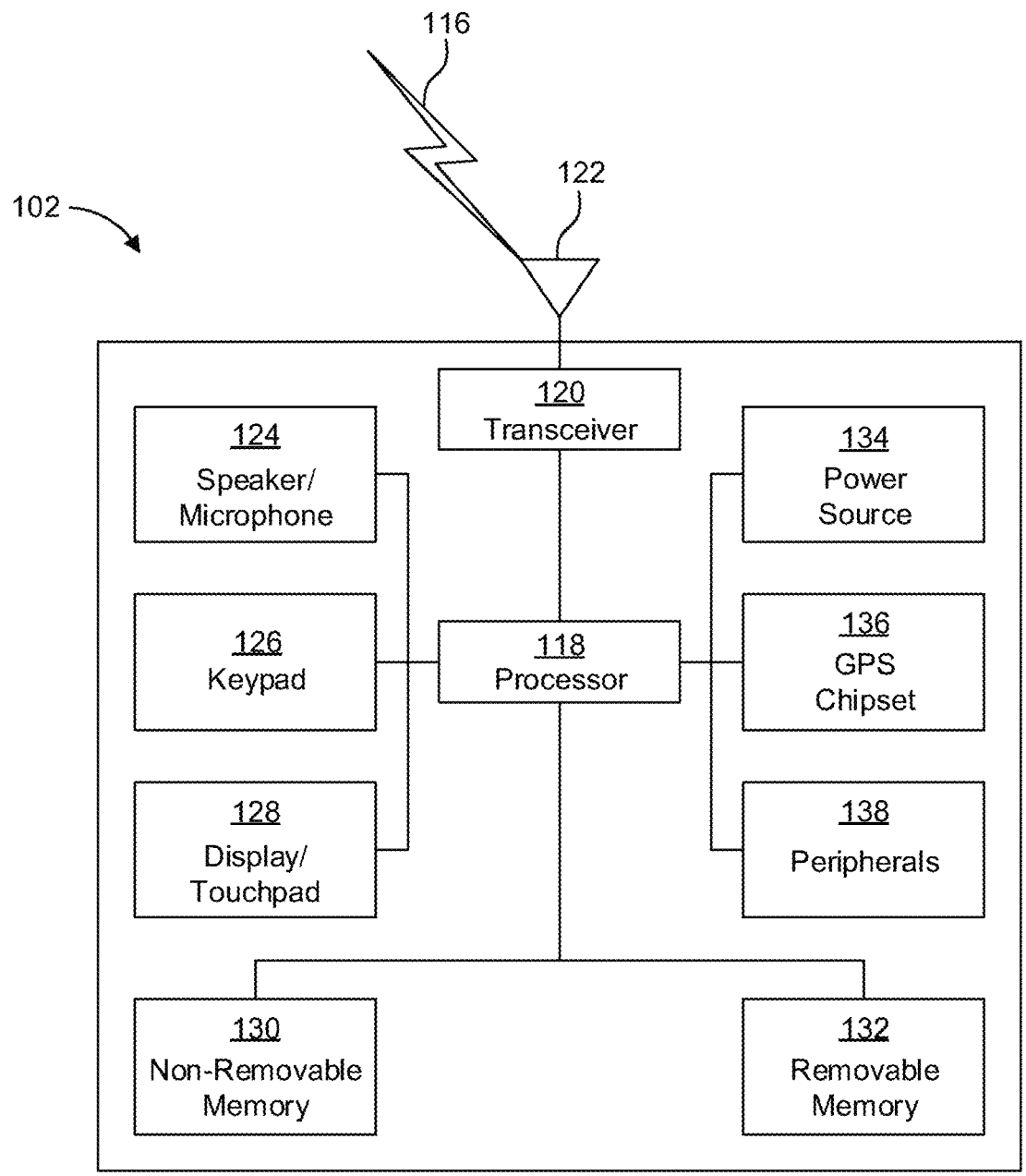
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 1C:
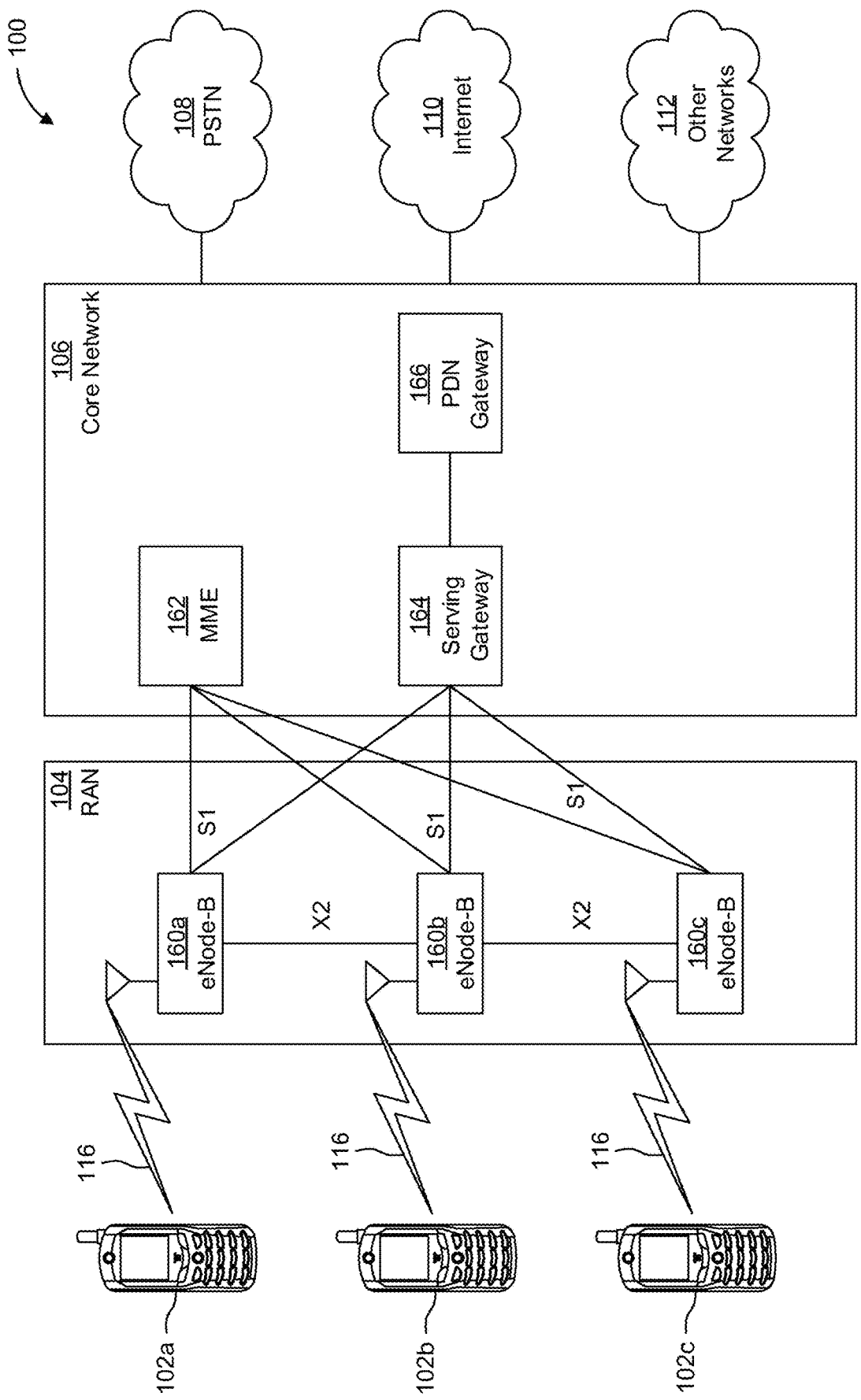
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHZ, 80 MHZ, and/or 160 MHz wide channels. The 40 MHZ, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHZ, 10 MHZ, and 20 MHz bandwidths in the TV White Space (TVWS) spectrum, and 802.11ah supports 1 MHZ, 2 MHZ, 4 MHZ, 8 MHZ, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHZ, 4 MHZ, 8 MHz, 16 MHZ, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
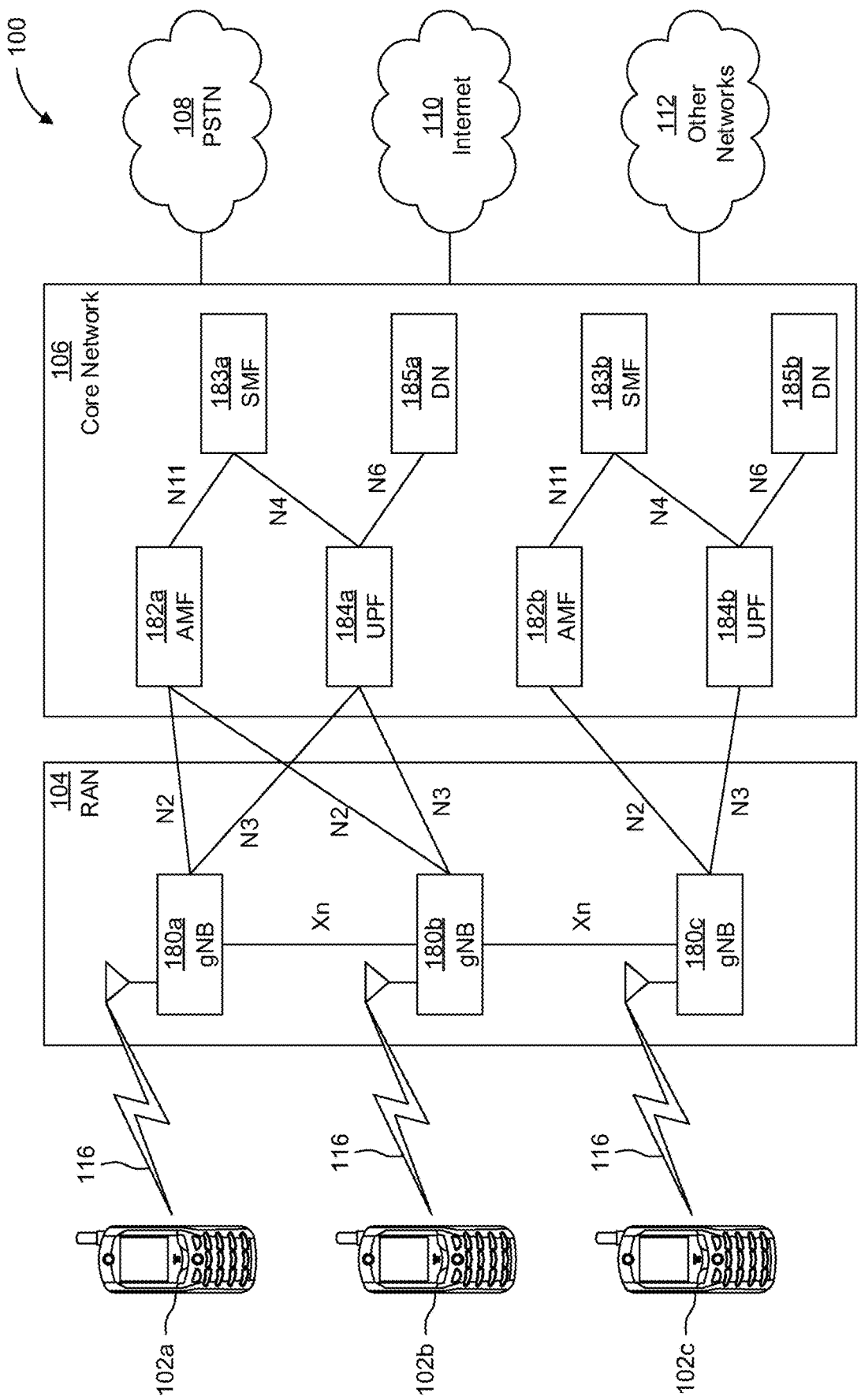
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102a, 102b, 102c over the air interface 116. The RAN 104 may also be in communication with the CN 106.

The RAN 104 may include gNBs 180a, 180b, 180c, though it will be appreciated that the RAN 104 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (COMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a, 184b, at least one Session Management Function (SMF) 183a, 183b, and possibly a Data Network (DN) 185a, 185b. While the foregoing elements are depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and the like. The AMF 182a, 182b may provide a control plane function for switching between the RAN 104 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating WTRU IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local DN 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

New Radio (NR) Release 17 may consider the use of both WTRU-to-network relays and WTRU-to-WTRU relays based on PC5 interfaces (e.g., sidelink). For example, initial versions of NR sidelink procedures were developed for NR Release 16, which may support V2X related road safety services. The design may provide support for broadcast, groupcast and unicast communications in both out-of-coverage and in-network coverage scenarios. However, it may be desirable to improve upon coverage extension and power efficiency improvement and consider a wider range of applications and services than was considered in Release 16, for example, in order to support enhanced quality of service (QOS) requirements.

For example, it may be desirable to consider WTRU-to-network coverage extension and/or WTRU- to WTRU-coverage extension. For WTRU-to-network coverage extension, air interface (i.e., Uu) coverage reachability may be necessary for WTRUs to reach the server in a PDN network or counterpart WTRU out of proximity area. The various options discussed in Release 13 regarding WTRU-to-network relays may be limited to EUTRA-based technology, and, thus, may not be applied to NR-based systems, for both NG-RAN and NR-based sidelink communication. For WTRU-to-WTRU coverage extension, current proximity reachability may be limited to single-hop sidelink links, either via EUTRA-based or NR-based sidelink technology. However, this may not be sufficient in the scenario where there is no Uu coverage, considering the limited single-hop sidelink coverage.

Some considerations may include, for single hop NR sidelink relays, mechanisms having minimal specification impact that support scheduling assignment (SA) requirements for sidelink-based WTRU-to-network and WTRU-to-WTRU relays, focusing on one or more aspects, for example, for layer-3 relays and layer-2 relays. Such aspects may include relay selection and/or re-selection criterion and procedures, relay/remove WTRU authorization, QoS for relaying functionality, service continuity, security of relayed connections after SA3 has provided its conclusion, and the impact on user plane protocol stack and control plane procedures (e.g., connection management of relayed connection). Other considerations may include, for example, support for upper layer operations of discovery models and/or procedures for sidelink relaying, assuming no new physical layer channel/signals.

Release 13 introduced relaying via proximity services (ProSe) WTRU-to-network relays to extend network coverage to an out of coverage WTRU by using a PC5 interface (e.g., D2D) between an out-of-coverage WTRU and a WTRU-to-network relay. A ProSe WTRU-to-network relay may provide a generic L3 forwarding function that may relay any type of IP traffic between a remote WTRU and the network. One-to-one and one-to-many sidelink communications may be used between the remote WTRU or WTRUs and the ProSe WTRU-to-network relay. For both remote and relay WTRUs, only one single carrier (e.g., the public safety ProSe carrier) operation may be supported (e.g., Uu and PC5 may be the same carrier for both the relay and remote WTRUs). The remote WTRU may be authorized by upper layers and may be in coverage of the public safety ProSe carrier or out-of-coverage on any supported carriers including the public safety ProSe carrier for WTRU-to-network relay discovery, selection or re-selection, and communication.

Relay selection or re-selection for ProSe WTRU-to-network relays may be performed based on one or a combination of Access Stratum (AS) layer quality measurements (e.g., reference signal received power (RSRP) measurements) and upper layer criteria. An eNB may control whether the WTRU may act as a ProSe WTRU-to-network relay. If the eNB broadcasts information associated with a ProSe WTRU-to-network relay operation, then ProSe WTRU-to-network relay operation may be supported in the cell. The eNB may provide one or more of the following: transmission resources for ProSe WTRU-to-network relay discovery using broadcast signaling for an RRC_IDLE state and dedicated signaling for an RRC_CONNECTED state; and reception resources for ProSe WTRU-to-network relay discovery using broadcast signaling.

The eNB may broadcast one or more minimum and/or a maximum Uu link quality (e.g., RSRP) thresholds that the ProSe WTRU-to-network relay may need to satisfy (or "respect") before it can initiate a WTRU-to-network relay discovery procedure. In some instances, such as when operating in an RRC_IDLE mode, when the eNB broadcasts transmission resource pools, the WTRU may use the threshold or thresholds to autonomously start or stop the WTRU-to-network relay discovery procedure. In some instances, such as when operating in an RRC_CONNECTED mode, the WTRU may use the threshold or thresholds to determine if it can indicate to an eNB that it is a relay WTRU and wants to start ProSe WTRU-to-network relay discovery. If the eNB does not broadcast transmission resource pools for ProSe WTRU-to-network relay discovery, then a WTRU may initiate a request for ProSe WTRU-to-network relay discovery resources by dedicated signaling, while satisfying (or "respecting") the one or more broadcasted thresholds.

If ProSe WTRU-to-network relay operation is initiated by broadcast signaling, the WTRU-to-network relay may perform ProSe WTRU-to-network relay discovery when in RRC_IDLE mode. If the ProSe WTRU-to-network relay is initiated by dedicated signaling, it may perform relay discovery when in RRC_CONNECTED mode. A ProSe WTRU-to-network relay performing sidelink communication for ProSe WTRU-to-network relay operation may need to be operating in RRC_CONNECTED mode. After receiving a layer-2 link establishment request or temporary mobile group identity (TMGI) monitoring request (e.g., an upper layer message), or any other logically equivalent message, from a remote WTRU, the ProSe WTRU-to-network relay may indicate to the eNB that it is a ProSe WTRU-to-network relay and intends to perform ProSe WTRU-to-network relay sidelink communication. The eNB may provide resources for ProSe WTRU-to-network relay communication.

A remote WTRU may decide when to start monitoring for ProSe WTRU-to-network relay discovery. The remote WTRU may transmit ProSe WTRU-to-network relay discovery solicitation messages while in RRC_IDLE or in RRC_CONNECTED depending on the configuration of resources for ProSe WTRU-to-network relay discovery. The eNB may broadcast a threshold, which may be used by the remote WTRU to determine if it can transmit ProSe WTRU-to-network relay discovery solicitation messages, to connect or communicate with a ProSe WTRU-to-network relay WTRU. The RRC_CONNECTED remote WTRU may use the broadcasted threshold to determine if it can indicate to the eNB that it is a remote WTRU and wants to participate in ProSe WTRU-to-network relay discovery and/or communication. The eNB may provide transmission resources using broadcast or dedicated signaling and reception resources using broadcast signaling for ProSe WTRU-to-network relay operation. The remote WTRU may stop using ProSe WTRU-to-network relay discovery and communication resources when RSRP goes above the broadcasted threshold. The exact time of traffic switching from Uu to PC5 or vice-versa may be determined by or signaled by higher layer functions, entities, or their logical equivalents.

A remote WTRU may perform radio measurements at the PC5 interface and use them for ProSe WTRU-to-network relay selection and re-selection along with higher layer criterion. A ProSe WTRU-to-network relay may be considered suitable in terms of radio criteria, for example, if the PC5 link quality exceeds a configured threshold (e.g., preconfigured or provided by the eNB). In some instances, the remote WTRU may select the ProSe WTRU-to-network relay that satisfies one or more criteria (provided by, e.g., higher layer signaling, higher layer functions or entities, or their logical equivalents) and has the best PC5 link quality among all suitable ProSe WTRU-to-network relays.

A remote WTRU may trigger ProSe WTRU-to-network relay reselection under one or more circumstances. For example, the remote WTRU may trigger ProSe WTRU-to-network relay reselection when a PC5 signal strength of the current ProSe WTRU-to-network relay is below the configured signal strength threshold and/or when the remote WTRU receives a layer-2 link release message (e.g., an upper layer message or any logical equivalent) from the ProSe WTRU-to-network relay.

In Release 14, a study for WTRU-to-network relays for commercial use cases tailored to wearables and IoT devices was performed in RAN. While such study did not result in any specification, a technical report (TR) provided some preferred solutions for such relays. Contrary to ProSe WTRU-to-network relays, which may use a layer-3 (IP layer) relaying approach, the WTRU-to-network relays for wearables were expected to be layer-2 relays based on the protocol stacks shown in FIGS. 2 and 3, introduced and described substantially in paragraphs below. Relay solutions in previous releases of the LTE specification were based on a one to one communication link established at upper layers (e.g., ProSe layer) between two WTRUs (e.g., the remote WTRU and the WTRU-to-network relay). Such connection was transparent to the AS layer and connection management signaling and procedures performed at the upper layers were carried by AS layer data channels. The AS layer was, therefore, unaware of such a one to one connection.

Figure 2:
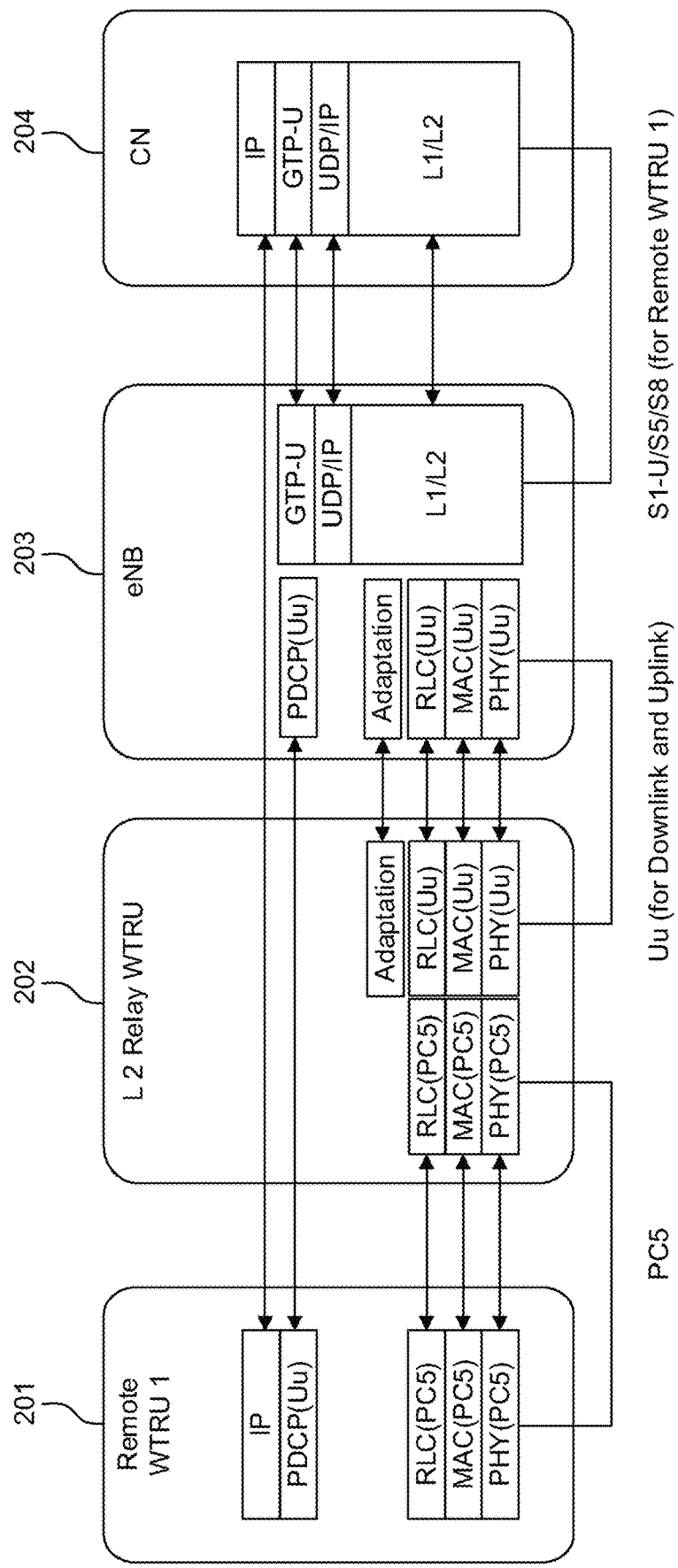
FIG. 2 is a diagram illustrating an example of a user plane radio protocol stack for a layer-2 evolved WTRU-to-Network relay.

FIG. 2 is a diagram illustrating an example of a user plane radio protocol stack for a layer-2 evolved WTRU-to-Network relay. As shown in FIG. 2, a remote WTRU 201 may interface with a layer-2 relay WTRU 202 via sidelink (i.e., the remote WTRU 201 and the relay WTRU 202 may communicate via a PC5 interface). The layer-2 relay WTRU 202 and eNB 203 may have lower layer links established with the eNB via Air Interface (Uu).

PDCP and IP links may be established between the remote WTRU 201 and the eNB 203 while RLC, MAC and PHY and non-3GPP transport layer links may be established between the remote WTRU 201 and the layer-2 relay WTRU 202 via PC5 and between the evolved layer-2 relay WTRU 202 and the eNB 203 via Uu. Relaying of user plane data from the remote WTRU 201 towards the Core Network (CN) 204, via the layer-2 evolved WTRU-to-Network Relay, and vice versa may be performed above the RLC layer (e.g., at the PDCP and IP layers).

Figure 3:
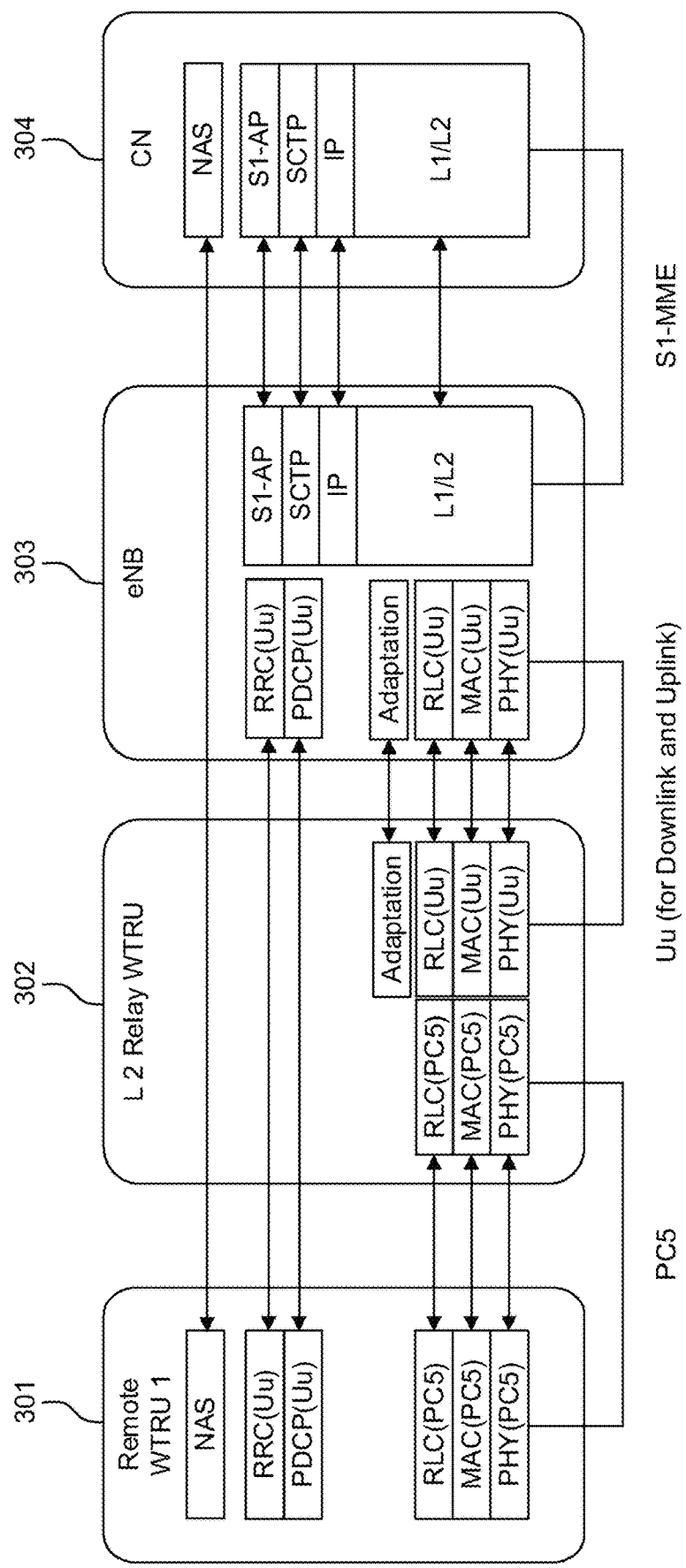
FIG. 3, is a diagram illustrating an example of a control plane radio protocol stack for a layer 2 evolved WTRU-to-network relay.

FIG. 3 is a diagram illustrating an example of a control plane radio protocol stack for a layer 2 evolved WTRU-to-network relay. Similarly as described with respect to elements 201, 202, 203, and 204 above for FIG. 2, a remote WTRU 301 may interface with a layer-2 relay WTRU 302 via sidelink (i.e., the remote WTRU 201 and the relay WTRU 202 may communicate via a PC5 interface). PDCP and RRC links may be established between the remote WTRU 301 and the eNB 303 while RLC, MAC and PHY and the non-3GPP transport layers may be established between the remote WTRU 301 and the layer-2 relay WTRU 302 via PC5 and between the evolved layer-2 relay WTRU 302 and the eNB 303 via Uu. Relaying of control plane data from the remote WTRU 201 towards the Core Network (CN) 204, via the layer-2 evolved WTRU-to-Network Relay, and vice versa may be performed above the RLC layer (e.g., at the PDCP and IP layers).

In systems operating in accordance with the NR V2X framework (e.g., as described in Release 16), the AS layer may support a unicast link between two WTRUs. Such unicast link may be initiated by upper layers (e.g., as in a ProSe one-to-one connection). However, the AS layer may be informed of the presence of such unicast link and any data that is transmitted in unicast fashion between the peer WTRUs. With such knowledge, the AS layer may support hybrid automatic repeat request (HARQ) feedback, channel quality indicator (CQI) feedback, and power control schemes that are specific to unicast links.

A unicast link at the AS layer may be supported via a PC5-radio resource configuration (RRC) connection. The PC5-RRC connection may be a logical connection between a pair of a source layer-2 ID and a destination layer-2 ID in the AS. One PC5-RRC connection may correspond to one PC5 unicast link. The PC5-RRC signaling may be initiated after its corresponding PC5 unicast link establishment. The PC5-RRC connection and the corresponding sidelink signaling radio bearers (SRBs) and sidelink dedicated radio bearers (DRBs) may be released when the PC5 unicast link is released as indicated by upper layers.

For each PC5-RRC unicast connection, a sidelink SRB may be used to transmit PC5-S messages (e.g., messages used to establish, maintain, or release a secure PC5 link between two WTRUs). Such messages may be transmitted before the PC5-S security has been established. One sidelink SRB may be used to transmit the PC5-S messages to establish the PC5-S security. One sidelink SRB may be used to transmit the PC5-S messages after the PC5-S security has been established, which may be protected. One sidelink SRB may be used to transmit the PC5-RRC signaling, which may be protected and only sent after the PC5-S security has been established.

PC5-RRC signaling may include one or more sidelink configuration messages (e.g., an RRCReconfiguration Sidelink message, or a logically equivalent message) by which a WTRU may configure the RX-related parameters of each side link radio bearer (SLRB) in the peer WTRU. Such reconfiguration messages may configure the parameters of each protocol in the L2 stack (e.g., service data adaptation protocol (SDAP) or packet data convergence protocol (PDCP)). The receiving WTRU may confirm or reject such configuration, depending on whether it can support the configuration suggested by the peer WTRU.

Integrated access and backhaul (IAB) in Release 16 may support backhaul radio link failure (RLF) indication. When a backhaul RLF recovery failure is detected at the IAB-mobile termination (MT), for each egress link associated with the IAB-distributed unit (DU), the transmitting part of the backhaul adaptation protocol (BAP) entity at the IAB-DU may construct a BAP control protocol data unit (PDU) for backhaul RLF indication. If the egress backhaul (BH) radio link control (RLC) channel for the BAP control PDU is configured, the BAP entity at the IAB-DU may submit the BAP control PDU to the configured egress BH RLC channel of the egress link. In some cases, such as when the egress BH RLC channel for the BAP control PDU is not configured, it may submit the BAP control PDU to any egress BH RLC channel of the egress link. Upon receiving a BAP control PDU for backhaul RLF indication from a lower layer (e.g., ingress BH RLC channel), the receiving part of the BAP entity may indicate to upper layers that the backhaul RLF indication has been received for the ingress link where the BAP control PDU is received.

Integrated Access and Backhaul (IAB) frameworks as described in Release 16 may support flow control feedback as follows. For a link, the transmitting part of the BAP entity at the IAB-MT may, when a flow control feedback is triggered when the buffer load exceeds a certain level, or when a BAP control PDU for flow control polling is received at the receiving part, construct a BAP control PDU for flow control feedback. If the egress BH RLC channel for the BAP control PDU is configured, it may submit the BAP control PDU to the configured egress BH RLC channel of the egress link. If the egress BH RLC channel for the BAP control PDU is not configured, it may submit the BAP control PDU to any egress BH RLC channel of the egress link.

Various problems for which solutions are proposed herein may be understood as follows.

Link management may be performed for an RRC_CONNECTED WTRU via the Uu RLM/RLF procedure. This procedure may use the quality of reference signals (RSs) transmitted by the network to determine when the link is no longer reliable. For sidelink connections, an analogous PC5-RRC connection between two WTRUs may exist such that link management is performed via an SL RLF procedure, which may involve monitoring the number of consecutive HARQ discontinuous transmissions (DTXs) observed by a transmitting WTRU and/or the number of consecutive RLC retransmissions performed.

In the case of a relayed link (e.g., WTRU-to-network (NW) relaying or WTRU-to-WTRU relaying) involving sidelink, individual link management procedures may not be sufficient because the link management on one link is not necessarily visible to another link. Mechanisms may therefore be desirable to make the failure on one link visible to another link. For example, in a WTRU-to-network relay scenario, a relay WTRU may trigger TX based RLF over the relayed link. However, such RLF may not be visible to the remote WTRU if the remote WTRU does not have regular transmissions of its own to trigger a similar RLF or if the SL channel is not reciprocal. In such cases, recovery may be delayed and may make service continuity difficult to achieve. Specifically, the network may be able to send data via Uu (in case of SL failure) but may not know whether the WTRU is reachable following failure given the premise that a WTRU connected via a WTRU-to-network relay should not be required to perform all the required Uu procedures (e.g., for power savings purposes).

Furthermore, recovery over Uu may be achieved via a re-establishment procedure, while no such procedure exists on SL, since another premise may be that a SL RRC connection exists between a single pair of WTRUs. For a relayed link, recovery may now be achieved by selecting a new relay. However, solutions for selecting such a relay or relays, such that the relay can achieve the same QoS of the failed link, are desirable.

Methods for link management and recovery for sidelink relays are described herein. Link management mechanisms applicable to both WTRU-to-WTRU relays and WTRU-to-network relays are discussed herein in detail.

Figure 4:
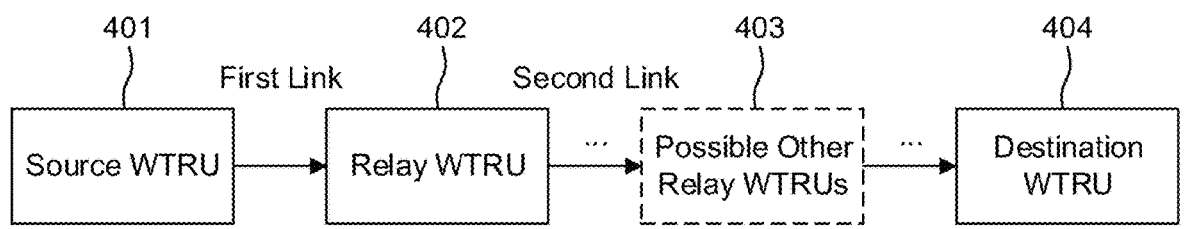
FIG. 4 is a diagram illustrating an example of WTRU-to-WTRU relaying.

FIG. 4 is a diagram illustrating an example architecture for link management and recovery in the context of WTRU-to-WTRU relaying. A relay WTRU 402 may be used as a WTRU-to-WTRU relay, as shown in FIG. 4. A first link as shown in FIG. 4 may correspond to the link between a source WTRU 401 and the relay WTRU 402. The second link may refer to the link between the relay WTRU 402 and any of the destination or next hop WTRU 403 in a multi-hop WTRU-to-WTRU or WTRU-to-network link. Generally speaking, the destination may be, for example, a WTRU or a network node depending on whether the relay is a WTRU-to-WTRU relay or a WTRU-to-network relay. In the case depicted in FIG. 4, the destination is the former, Destination WTRU 404. Without loss of generality, the term source WTRU may also refer to the relay WTRU being served by another relay along the link to a destination.

Figure 5:
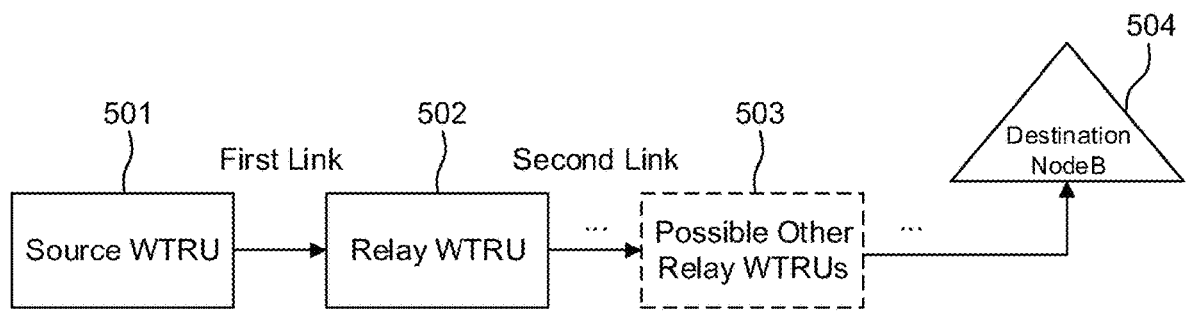
FIG. 5 is a diagram illustrating an example of WTRU-to-network relaying.

FIG. 5 is a diagram illustrating another example architecture for link management and recovery specifically in the context of WTRU-to-network relaying. The relay WTRU may be used as a WTRU-to-network relay, as shown in FIG. 5. A first link as shown in FIG. 4 may correspond to the link between a source WTRU 501 and the relay WTRU 502. The second link may refer to the link between the relay WTRU 502 and any of the destination or next hop WTRU 503 in a multi-hop WTRU-to-WTRU or WTRU-to-network link. In the case depicted in FIG. 5, the destination is a NodeB 504. Without loss of generality, the term source WTRU as described with respect to FIG. 5 may also refer to a relay WTRU being served by another relay along the link to a destination.

In some embodiments, a WTRU configured as an SL relay (e.g., a WTRU-to-network relay or a WTRU-to-WTRU relay) may send a link problem indication to one or more other WTRUs via sidelink. Such indication may be sent to the source WTRU of a relayed connection or another WTRU that is involved in the relay connection, as per, for example, the architectures described herein and shown in the drawings. Such indication may be sent upon detection of a link problem detected between the relay WTRU and the NW (for WTRU-to-network relay) or a link problem detected between the relay WTRU and another WTRU (which may be the destination WTRU or another relay WTRU, as per, for example, the architectures described herein and shown in the accompanying FIGS.).

A link problem indication (LPI) may be an L2 protocol message sent via any or a combination of a PC5-RRC message, an SL MAC control element (CE), or an L2 control PDU, such as an RLC control PDU, an adaptation layer (or relay adaptation layer) control PDU, a PDCP PDU, or any other logical equivalent. For example, a WTRU may send an LPI as a PC5-RRC message, and include, along with the message, an SL medium access control (MAC) CE and/or adaptation control PDU containing some of the information described herein and associated with the LPI. Alternatively, or additionally, an LPI may be sent via a sidelink control information (SCI) message.

An LPI may broadcast/groupcast to all source WTRUs that are served by a particular relay WTRU. For example, a relay WTRU may be configured with an L2 source/destination ID (or a logically equivalent source/destination ID) for transmission of an LPI or similar status messages intended to each or a subset of the source WTRU served by the relay WTRU. A relay WTRU (and the corresponding source WTRUs) may determine such L2 ID based on any combination of one or more indications received from upper layers, derive the L2 ID from a RAN ID, or determine the L2 ID based on its own configured L2 IDs, and/or based on L2 address exchange procedure in the PC5-RRC configuration with each source WTRU. When the relay WTRU determines the L2 ID based at least on upper layers, for example, the relay WTRU and corresponding WTRUs may receive the L2 explicitly from upper layers and/or from the network, for example, when configured to act as/use a relay WTRU. When the relay WTRU determines the L2 ID by at least deriving it from a RAN ID, for example, the relay WTRU may use any function of a RAN ID, such as cell radio network temporary identifier (C-RNTI), inactive RNTI (I-RNTI), or international mobile subscriber identity (IMSI).

When the relay WTRU determines the L2 ID based at least on its own configured L2 IDs, for example, the relay WTRU may reuse one of its own L2 source/destination IDs, potentially with some other information, to construct the source/destination ID for transmission of the LPI. For example, the relay WTRU may use a subset of bits of one of its source/destination IDs and append a special combination of bits to it to create the groupcast source/destination ID. For example, the relay WTRU may use a subset of bits of an upper layer provided source/destination ID and append a WTRU specific identifier, which may be selected randomly, assigned by the network, or derived from some other RAN ID (e.g. C-RNTI or IMSI).

When the relay WTRU determines the L2 ID based at least on L2 address exchange procedure in the PC5-RRC configuration with each source WTRU, for example, the relay WTRU may be configured (e.g., by upper layers) with an L2 source/destination ID to use for transmission of the LPI message and may send this to each source WTRU during PC5-RRC configuration procedure for link establishment. For example, the relay WTRU may determine the source/destination address using any means described in the above examples (e.g., derived from a RAN ID) and may provide the ID or IDs in the PC5-RRC configuration procedure to each of the source WTRUs.

Once the source WTRU is aware of the L2 source/destination ID associated with transmission of the LPI message, the source WTRU may monitor the source/destination ID for reception of the groupcast LPI message transmitted by the relay WTRU.

In some embodiments, the LPI may be transmitted in a dedicated message on a PSCCH or PSSCH identified with a special SCI or SCI format (e.g., an SCI without source/destination ID). For example, a new SCI format may be created (e.g., using a reserved bit in the SCI) that contains an identifier for the transmission other than the L1 source/destination ID. For example, this SCI may indicate a new transmission type (e.g., relay specific broadcast transmission to source WTRUs). The SCI may further contain an identifier or parameter identifying the relay WTRU, such as: a RAN-specific identity for the relay WTRU (e.g., as described herein), an identifier for the relay WTRU exchanged via PC5-RRC (e.g., as described herein), and/or an identifier provided by upper layers (e.g., as described herein).

In some embodiments, the LPI may be transmitted on a dedicated PHY channel, such as a physical sidelink control channel (PSCCH), physical sidelink shared channel (PSSCH), or physical sidelink feedback channel (PSFCH), if the contents of the LPI are limited (e.g., contain only the indication of RLF). Some dedicated resources may be configured for transmission of the LPI on any of the dedicated PHY channels. Specifically, a WTRU-to-WTRU relay may be configured with a PSFCH resource (e.g., occurring periodically) for transmitting the LPI. For example, the relay WTRU may transmit an indication (e.g., HARQ acknowledgment (ACK) or HARQ negative acknowledgement (NACK)) on the PSFCH resource when transmitting an LPI. The relay WTRU may be configured (e.g., by the NW) with one such PSFCH resource per destination WTRU or relay WTRU for the second link and/or information to be sent (e.g., as per contents of the LPI).

A source WTRU may receive (e.g., in PC5-RRC signaling with the relay WTRU during link establishment) the dedicated configuration/resource associated with the PHY channel associated with the LPI. The source WTRU may monitor such resource to determine reception of an LPI associated with a relayed link.

A relay WTRU may send a link problem recovery indication (LPRI). Such LPRI may be associated with an event that triggered the LPI. A WTRU that sends an LPI may initiate monitoring for transmission of an LPRI. A WTRU may transmit an LPRI whenever the condition that triggered the associated LPI is relieved. Any of the conditions mentioned herein for the LPI may be considered for the LPRI when the LPI condition is alleviated. For example, a WTRU may send an LPI associated with the buffer status above a CR/resource pool dependent threshold and may then send an LPRI when such buffer status falls below another (possibly related) threshold.

A source WTRU that receives an LPRI may cancel any operation related to relaying, relay reselection/reconfiguration, or similar, which may have been started as a result of reception of an LPI.

In some examples, an LPI may initiate (possibly more frequent) discovery for relay selection and/or change the priority/parameters of discovery message transmission. A WTRU may stop such discovery at reception of an LPRI indicating the condition is alleviated. If the conditions indicated in the LPI persist (e.g., upon reception of an LPRI indicating a second condition has been met or upon timer expiry without reception of a second LPI or an LPRI), the WTRU may trigger cell reselection and/or reconfiguration of the relayed link.

In some examples, a WTRU may initiate part of the relay reselection procedure upon reception of the LPI and then complete the reselection/reconfiguration if the WTRU does not receive an LPRI indicating alleviation of the condition or if a timer expires without reception of such LPRI.

A relay WTRU may send information in the link problem indication in a periodic manner. The period may depend on the value of one or more parameters, further discussed below. In some instances, a relay WTRU may send an LPI upon one or a combination of the following conditions: RLF on the second link associated with a destination, failure to perform recovery, relay selection or re-selection (possibly associated with a time duration over (or within) which recovery or selection or re-selection should occur, and/or reception of a link problem indication from another WTRU. In some instances, a relay WTRU may send an LPI based on a measure of CBR/CR, based on a relay-specific CR, based on number of consecutive HARQ feedback failures, based on the value of a counter and/or timer related to the second link (whether to a WTRU or to the network), based on buffer load at the relay, based on CQI/RSRP measurements received/transmitted by the relay WTRU, based on QoS (e.g., observed latency or remaining PDB) of the configured bearers and/or data in the relay buffers, based on configuration by the peer (source) WTRU (either implicit or explicit), based on resource pool configuration, based on Uu quality/conditions, based on Uu mobility event, based on Uu failure, based on whether a current link configuration/status allows for detection of RLF/link problem at the source WTRU based on an absence of a feedback response, and/or based on whether the first link is configured with a mechanism for determining RLF, such as any or a combination of specifically in the context of WTRU-to-WTRU relaying the relay WTRU being configured or pre-configured for a number of SCI with HARQ feedback enabled over a configured or pre-configured past time window and/or the relay WTRU being configured with at least one SLRB (potentially not counting the SL SRBs) configured with RLC AM.

Regarding RLF on the second link associated with a destination, for example, a relay WTRU may send an LPI upon triggering RLF associated with the second link to a destination WTRU of a WTRU-to-WTRU relayed connection. Specifically, the WTRU may transmit the LPI to a source WTRU when the RLF occurred for a destination for which the source WTRU was connected via the relay. For example, a relay WTRU may send an LPI upon triggering Uu RLF associated with the second link of a WTRU-to-network relay.

Regarding failure to perform recovery, for example, a relay WTRU may start a timer or start measuring a time duration following RLF on the second link. The relay WTRU may initiate relay selection or re-selection. If re-selection is not completed before expiry of a timer, or upon a determination that a time duration has elapsed, the relay WTRU may send the LPI message.

Regarding reception of a link problem indication from another WTRU, for example, a relay WTRU may receive an LPI from another WTRU (e.g., the next hop relay WTRU) on the second link, and may transmit an LPI and/or forward the received LPI to the source WTRU.

Regarding a measure of CBR/CR, for example, a WTRU may transmit an LPI when the measured CBR/CR meets some configured pre-configured condition. Such condition may depend further on the QoS of the data transmitted by the relay and/or SLRB/relaying configuration at the relay. Such condition may depend on other conditions mentioned herein for sending the LPI. Such condition may consist of the CBR/CR reaching some configured or pre-configured value, possibly for some period of time. For example, a WTRU may transmit the LPI when the measured channel busy ratio (CBR) exceeds a configured or pre-configured threshold, possibly for a period of time. For example, a WTRU may transmit the LPI when the channel occupancy ratio (CR) exceeds a configured pre-configured threshold.

Regarding a relay-specific CR, a WTRU may determine a relay-specific CR. In particular, a relay WTRU may measure the amount of resources reserved/utilized for transmission of relayed traffic and/or the ratio of the CR applicable to relayed traffic. A WTRU may determine such ratio by determining the ratio of traffic in its buffers for relayed traffic vs non-relayed traffic and multiply such ratio to the measured CR. A WTRU may determine the relay-specific CR by determining the amount of resources over the total number of resources in the resource pool that were used to transmit to a destination ID associated with a relayed link or containing data from LCHs associated with relayed links.

Regarding a number of consecutive HARQ feedback failures, a relay WTRU may transmit an LPI to a source WTRU when the number of consecutive DTX receptions to a HARQ-based transmission for a destination reaches some value. Such destination may correspond to the destination for which the source WTRU is communicating to via the WTRU-to-WTRU relay. For example, a relay WTRU, following transmission of an LPI for the consecutive DTXs, may trigger an LPI or LPRI when RLF is triggered, or when the number of consecutive DTXs is reset.

Regarding value of a counter and/or timers and/or time durations related to the second link, for example, a WTRU-to-network relay WTRU may transmit LPI to a source WTRU when e.g., a timer T310 is started, when T310 has expired, when T310 reaches some configured or pre-configured value, or when the number of consecutive OOS reaches some preconfigured value. Stated alternatively, a WTRU-to-network relay WTRU may transmit LPI to a source WTRU when e.g., a time duration begins, when the time duration has elapsed, when some configured or preconfigured duration of time duration, or when the number of consecutive OOS reaches some preconfigured value. For example, a WTRU-to-WTRU relay may transmit LPI to a source WTRU when the number of consecutive RLC retransmissions reaches a configured or pre-configured value.

Regarding buffer load at the relay, for example, the WTRU may send the LPI when the buffer load exceeds a threshold. Such threshold may further depend on QoS, SLRB configuration, number of relayed source WTRUs/LCHs, etc. For example, the buffer load triggering the LPI may be the load of a single LCH or may be an overall load of all LCHs or relayed LCHs at the relay WTRU.

Regarding CQI/RSRP measurements received/transmitted by the relay WTRU, for example, the WTRU may send the LPI when the CQI measurements received by the relay of WTRU (e.g., of the second link) are above/below a threshold.

Regarding a QoS of the configured bearers and/or data in the relay buffers, for example, the WTRU may send an LPI based on any condition (possibly in combination with another condition) associated with the latency of the SLRBs and/or the latency of the data currently buffered in the relay WTRUs buffers (possibly for relayed connections). For example, the WTRU may send the LPI when the amount of data in the buffered for any relayed LCH which has a latency below a threshold (or an expected remaining PDB below a threshold) is above a threshold.

Regarding configuration by the peer WTRU, a relay WTRU may be configured by the peer WTRU (e.g., in PC5-RRC signaling) as to whether to send the LPI upon the occurrence of a specific trigger or not. For example, a relay WTRU may be configured with one or both of the two following behaviors upon detecting RLF on the second link: upon detecting RLF on the second link, the relay WTRU releases the PC5-RRC connection associated with the second link immediately, does not send the LPI or send the LPI to the source WTRU (e.g., potentially containing an RLF indication) and waits for confirmation before releasing the PC5-RRC connection. The relay WTRU may further suspend any transmissions performed on the second link associated with the link which is in RLF. Such configuration may be provided as part of the SLRB configuration. For example, the relay WTRU may receive such a configuration parameter per SLRB and may select the behavior based on at least one of the configured SLRBs having the associated behavior configured.

An implicit configuration of whether to send the LPI may be defined in terms of the activation/deactivation status of the link itself, the WTRU location, the WTRU RRC state, and/or the WTRU coverage status. Regarding the activation/deactivation status of the link itself, for example, a relayed link may be activated/deactivated by the source WTRU and/or NW and/or upper layers. The WTRU may send the LPI only when the link is activated and may drop or buffer the LPI (e.g., to send at the time of activation) when the link is deactivated. For example, the WTRU may broadcast the LPI to all source WTRUs as long as at least one link to a source WTRU is activated. Regarding the WTRU location, for example, the WTRU may be configured with a zone or a rule in terms of its relative location with another WTRU or the NodeB (e.g., a gNB) about whether it should send the LPI. Regarding the WTRU RRC state, for example, the WTRU may determine whether to send the LPI in case another trigger is satisfied based on the current RRC state of the relay WTRU. Regarding the WTRU coverage status, for example, the WTRU may determine whether to send the LPI in case another trigger is satisfied based on whether the WTRU is in coverage of Uu or not.

Regarding resource pool configuration, for example, any condition described herein for sending the LPI may further depend on the transmission resource pool configuration. For example, a WTRU may send the LPI if the amount of data in the buffers exceeds some value that is dependent on the density of slots/subchannels available for transmission by the relay and/or the measured CR/CBR at the relay WTRU. For example, a relay WTRU may send an LPI (e.g., for flow control purposes) when the amount of relayed data in the buffers exceeds a TX-pool specific threshold. For another example, the relay WTRU may send an LPI (e.g., for flow control purposes) when the amount of relayed data in the buffers exceeds a function of the CBR/CR and/or the number of subchannels for TX in the resource pool and/or the average latency/remaining PDB of the data currently buffered at the relay WTRU.

Regarding Uu quality/conditions, the relay WTRU may send an LPI as a result of any of Uu cell RSRP/RSRQ (e.g., below a threshold) and/or measured CQI (e.g., below a threshold).

Regarding Uu mobility event, for example, the relay WTRU may send an LPI as a result of any of a handover/reconfiguration/conditional handover/PSCell change is received/triggered at the relay WTRU, a cell reselection event is triggered at the relay WTRU, and/or the relay WTRU changes tracking area, RAN paging area, or similar, or moves outside the coverage of a configured or pre-configured set of cells.

Regarding Uu failure, for example, a relay WTRU may send an LPI as a result of any of RLF, failed re-establishment, failed reconfiguration/handover/PSCell change.

Regarding whether a current link configuration/status allows for detection of RLF/link problems at the source WTRU based on absence of feedback/response, for example, a relay WTRU may select between one of the following two behaviors at RLF of the second link: release the PC5-RRC connection associated with the second link immediately and do not send the LPI and/or send the LPI to the source WTRU (e.g., potentially containing an RLF indication) and wait for confirmation before releasing the PC5-RRC connection. The WTRU relay WTRU may further suspend any transmissions performed on the second link associated with the link which is in RLF.

A relay WTRU may include, in the LPI to the source WTRU, any of an indication of failure, an indication of a triggered relay selection/reselection initiated by the relay or of a triggered Uu re-establishment triggered by the relay, quantities associated with any of the conditions described herein for transmitting the LPI, L2 source/destination ID of the next hop (possibly for which the LPI is applicable (e.g., the link which triggered RLF)), one or more RLF-related parameters associated with the second link, one or more LCHs for which the other LPI contents apply, cell ID of the cell on which the relay WTRU experienced RLF/failed re-establishment, or any condition related to the RLF, cell ID of the new applicable for the WTRU-to-network relayed connection (either to be assumed following reception of the LPI or after completion of the reselection procedure), one or more relay reselection candidates (e.g., source/destination L2 ID of a relay and/or cell ID) and some associated measurement/selection metric (such as SL/Uu RSRP measurement), and/or identifier to be used by the WTRU following reception of the LPI (e.g., to continue communication following the LPI and/or following successful reselection).

Regarding indication of failure, for example, the LPI may include an identifier that further identifies the reason for the failure, or the resource for transmission of the LPI, whereby any of the described triggers herein may be different reasons. Regarding indication of a triggered relay selection/reselection, for example, a relay WTRU may decide to trigger a relay selection or relay reselection upon some conditions associated with transmission of the LPI. The relay WTRU may include such information in the LPI. Regarding quantities associated with conditions described herein for transmitting the LPI, these may include, for example, relay buffer load, CBR, CR, or RSRP. For example, the LPI may include a status of the last packet successfully transmitted over the second link (e.g., RLC status/number), possibly for each relayed RLC channel associated with the source WTRU to which the LPI is being sent.

Regarding one or more RLF-related parameters associated with the second link, these may include, for example, the number of consecutive DTX to HARQ transmissions experienced by the relay WTRU, the number of consecutive RLC retransmissions experienced by the relay WTRU, the number of OOS, or some value of a counter/timer related to RLF of the second link. For example, the relay WTRU may send a set of transmissions/retransmissions that the relay WTRU missed and/or did not send HARQ feedback for. The relay WTRU may determine the missing transmissions/retransmissions based on reception of a DAI (or similar) on sidelink. The source WTRU may account for such missed transmissions (e.g., subtract from the number of DTX to HARQ) in the RLF determination algorithm. For another example, the relay WTRU may send a number of consecutive IS/OOS, the value of any counter, the value of a timer (e.g., T310), or the value of a time duration to be measured, to the source WTRU or a WTRU-to-network relay link. For example, the relay WTRU may send the value of T310 or a time duration to be measured, may send an indication that the value of T310 has reached a threshold, or may send an indication that a time duration has elapsed. Regarding an identifier to be used by the WTRU following reception of the LPIE, these may include, for example, any of source/destination L2 ID, C-RNTI, A-RNTI, or a similar Uu or SL identifier.

A relay WTRU may create an SLRB for transmission to a source WTRU, upon initiation of a link by the source WTRU. For example, a relay WTRU may create an SLRB towards the source WTRU upon reception of a PC5-RRC message from the source WTRU. Alternatively, or additionally, a relay WTRU may create an SLRB towards the source WTRU upon indication from upper layers that it will act as a relay WTRU for a specific source/destination L2 ID and/or reception of a source/destination routing table from upper layers. For example, such an SLRB may be used for transmission of the LPI in a secured manner.

In some embodiments, a WTRU may modify its link management decisions/actions as a function of reception of the LPI/LPRI and/or contents (or a function of the contents) of the LPI/LPRI. For example, a WTRU may perform any or a combination of: trigger RLF of the relayed link for which LPI is received; pause, start, or restart HARQ feedback monitoring for RLF; initiate a relay reselection procedure; modify/reset any counter associated with HARQ feedback monitoring for RLF associated with the relayed link; modify/change/select the condition for triggering RLF associated with the relayed link (e.g., changing the number of consecutive HARQ DTX for RLF); change the transmission path from one relayed link (the one for which the LPI is received) to a different relayed link, possibly determined after relay selection; or inform upper layers.

In some embodiments, the source WTRU may trigger SL RLF following reception of an LPI indicating SL RLF. The source WTRU may delete all context associated with the PC5-RRC connection with the relay WTRU that transmitted the LPI and may inform upper layers of the SL RLF. In some embodiments, the source WTRU may initiate relay reselection following reception of an LPI indicating SL RLF on the second link. The source WTRU may suspend transmissions to the relay WTRU that sent the LPI, possibly while reselection is performed. Upon successful reselection, the source WTRU may inform upper layers of the successful reselection and/or may change the source/destination ID of any SLRBs transmitted via the original relay WTRU to a new source/destination ID provided by upper layers, possibly following reselection. Upon failed reselection, the source WTRU may trigger SL RLF instead.

A source WTRU may determine/change any aspect of its RLF determination mechanism based on information in the LPI. In some embodiments, a WTRU may determine the maximum number of consecutive DTXs in response to HARQ-based transmissions that trigger RLF based on any or a combination of the following parameters reported in the LPI. The WTRU may further change the maximum number of consecutive DTXs in response to HARQ-based transmissions that trigger RLF from a first value to a second value upon reception of an LPI/LPRI where the value of the following parameters are changed compared to the previous LPI/LPRI: the CR measured by the relay WTRU, the CBR measured by the relay WTRU, the amount of data in the relay WTRU buffers or the relay WTRU buffer occupancy (possibly associated with a single link or all relayed links), a measure of latency associated with the data in the buffers (potentially associated with relaying data), the TX resource pool configuration of the relay WTRU (which may be the same/different as the TX resource pool configuration of the source WTRU), the CQI on the second link, received by the relay WTRU from its peer WTRU, and further reported by the relay WTRU to the source WTRU, some measure of the channel capacity/efficiency of the second link measured by the relay WTRU, and/or whether transmissions are being made to a relay WTRU or directly to a peer WTRU, and the number of hops associated with the relayed path. Regarding measure of latency associated with the data in the buffers, for example, a WTRU may calculate an average latency metric for the data in its buffers by assigning a latency value to each packet (e.g. based on the LCH associated to that packet).

In some embodiments, a WTRU may set the number of consecutive DTXs to a first value if the CR measured by the relay WTRU is below a threshold and to a second value if the CR is above a threshold. In some embodiments, a WTRU may suspend counting of HARQ-based DTXs for RLF determination, possibly for a period of time, upon reception of an LPI, possibly where such LPI contains values for the parameters mentioned in the above example which meet some configured or pre-configured criteria. In some embodiments, a WTRU may reset the number of HARQ-based DTXs counted upon reception of an LPI/LPRI (possibly where such LPI/LPRI contains values for the parameters mentioned in the above example which meet some configured or pre-configured criteria).

In some embodiments, a WTRU may declare RLF based on a number of HARQ-based DTXs counted over a configurable window. The WTRU may perform RLF in this manner only when the contents of the LPI meet some condition. For example, the WTRU may perform RLF in this manner only when the CR and/or buffer status reported by the relay WTRU is above a threshold. A WTRU may further determine the number of HARQ based DTX that triggers RLF and/or the window size based on such parameters in the LPI.

In some embodiments, a WTRU may ignore specific HARQ-based DTX when counting consecutive DTXs according to some predefined algorithm or pattern. For example, a WTRU may skip counting of every N DTXs when counting the number of consecutive DTXs, where N may further depend on a parameter in the LPI.

In some embodiments, a WTRU may determine whether to deactivate (e.g., maintain the link for later activation and for reception of measurements, LPRI/LPI messages) the link or to release the link based on one or more of the presence of: another active link to the same destination via a different relay, the QoS associated with the active bearers on the relayed link, and/or any information received in the LPI message itself (e.g., CBR/CR/CQI).

For example, a WTRU may activate a second link to the same destination (e.g., via another relay WTRU) and/or deactivate the first link following reception of an LPI message, potentially with information that meets any criteria similar to that described herein (e.g., for trigger of the LPI message). For example, a WTRU that receives an indication of RLF from the relay WTRU may respond to the relay WTRU with a deactivation message. The source WTRU may then perform relay reselection and/or activation of a different link to the same destination (via another relay). For another example, a WTRU may release a link if the QoS does not require multiple active links to the same destination and the WTRU successfully reselects another link to the destination and/or has another link to the same destination active at the time of reception of the LPI.

In some embodiments, a WTRU (e.g., source WTRU or relay WTRU) may decide whether to perform relay reselection (e.g., following reception of an LPI or similar trigger for sending LPI described herein) at the source WTRU or perform relay reselection at the relay WTRU. For example, relay selection at the relay WTRU may involve introducing a larger number of hops in the overall end-to-end link. For example, relay selection at the source WTRU may have the advantage that it may not require an increase in the number of hops. The decision of which WTRU performs relay reselection may be made by the source WTRU or the relay WTRU. The relay WTRU may itself be considered as a source WTRU in a multi-hop environment.

In some embodiments, the decision may be made by the source WTRU based on information provided by the relay WTRU. In other embodiments, the decision may be made by the relay WTRU based on information provided by the source WTRU. A WTRU (source or relay) may make such decision based on any or a combination of the following information (where each such information may be provided by or relevant to the other WTRU and/or determined on its own or relevant to itself): the QoS or SLRB configuration, the communication range requirements at the source WTRU and/or relay WTRU, the synchronization source of the source WTRU and/or relay WTRU (potentially in reference to the destination WTRU, the location of the source and/or relay (potentially in relation to each other or in relation to another entity such as a NodeB (e.g., a gNB) or destination WTRU, the CBR/CR/CQI/RSRP or similar measurements, the number of potential relay WTRUs determined based on relay discovery procedure, a measurement quality criteria (e.g., RSRP measurement,) or any function thereof, of one or a number of the potential relay WTRUs determined based on relay discovery procedure (possibly in comparison with the current relay quality), the number of relay hops, and/or the Uu RSRP measurements of the link between the last hop relay and the NW (in the case of WTRU-to-network relay).

Regarding the QoS and/or SLRB configuration, for example, the SLRB configuration of any configured bearers may or may not allow the relay WTRU to perform reselection only under certain conditions. Regarding the communication range requirements at the source WTRU and/or relay WTRU, for example, based on communication range requirements and possibly the position of the relay WTRU, reselection may not be allowed by the relay WTRU. Regarding the synchronization source of the WTRU and/or relay WTRU, for example, reselection may be performed by the WTRU (remote or relay WTRU), which may result in maintaining the current sync source or to favor synchronization to a WTRU with the same sync source as, for example, the relay WTRU or destination WTRU. Regarding the location of the source and/or relay, for example, location may be determined based on the configured zones. Regarding the measurement quality criteria, it may include, for example, the maximum RSRP of any potential relay WTRU, the average value of the RSRP of a number/all potential relays WTRUs, the RSRP of a potential relay WTRU becoming better than a first threshold while the RSRP of the current relay becomes worse than a second threshold, and/or the RSRP of a potential relay becoming some amount better than the current relay WTRU.

In some embodiments, a relay WTRU may be configured or pre-configured with one or a set of conditions based on the above information (e.g., as measured at the relay WTRU) to determine whether to initiate resource reselection or inform the source WTRU to perform relay selection. For example, the relay WTRU may perform relay reselection and/or reconfiguration of the second path following any triggers similar to those for transmission of the LPI message if the number of hops resulting from reconfiguration to the reselected/reconfigured relay path to the destination is below a QoS/SLRB dependent threshold. Otherwise, the relay WTRU may transmit the LPI message to the source WTRU, possibly indicating the need to perform relay reselection at the source WTRU. The source WTRU may perform the relay reselection upon reception of the LPI message.

For another example, the relay WTRU may perform relay reselection and/or reconfiguration of the second path following any triggers similar to those for transmission of the LPI message if the RSRP of the selected relay is above a configured or pre-configured threshold. A relay WTRU in examples such as this, or any reselection procedure, may further perform one of the following procedures. For instance, the relay WTRU may inform the source WTRU (e.g., via an LPI or similar message) that the relay WTRU is performing relay reselection. For example, the source WTRU may buffer any traffic to the relay WTRU during performance of the relay reselection. The relay WTRU may inform the source WTRU of any successful or failed reselection performed by the relay WTRU. For example, the WTRU may provide the source WTRU with updated configuration and/or QoS information of the updated link to the destination, such as new cell ID of the new cell to which the last hop relay WTRU is connected, new number of hops to the destination, expected latency or other expected QoS over the new link to the destination, new bearer configuration or bearer mapping configuration or capability information associated with subsequent nodes (e.g., relay of NW) along the new path, such as support for multicarrier or support for full duplex operation.

In another example embodiment, the relay WTRU/source WTRU may provide the relay selection candidates to the source WTRU/relay WTRU in transmission of the LPI or in a response to the LPI. The source WTRU/relay WTRU may determine whether to perform relay selection and/or instruct the relay WTRU/source WTRU to perform relay selection based on comparison of the measurement quality metric of the WTRUs own candidates and the other WTRUs candidates. For example, the WTRU may determine that it is to perform reselection if its candidates have a higher RSRP than the other WTRU candidates. For example, the WTRU may determine that it performs reselection if the RSRP of its candidates is an offset better than the other WTRU candidates, where such offset may depend on which WTRU (e.g., source WTRU or relay WTRU) makes the decision and/or any other factor mentioned in the exchanged/used information herein and/or information in the LPI.

In some embodiments, a WTRU may determine RLF based on a combination of a number of consecutive number of HARQ-based DTXs and receptions from the peer WTRU, where such receptions may be reception of an LPI or another transmission by the peer/relay WTRU. A source WTRU may determine a transmission received by the peer WTRU to be associated with the same source/destination ID as its own transmissions, but where the source and destination ID are inversed. Alternatively, or additionally, a source WTRU may determine a reception by the peer WTRU to be any reception received by a reverse control channel, described in more detail herein.

In an example, a WTRU may reset the number of consecutive DTXs in an RLF determination upon reception from the relay/peer WTRU. Such reception may be an RLC buffer status, a flow control indication, a measurement indication, an LPI/LPRI, an RS transmission, a measurement report, or any data/control transmission. In another example, a WTRU may trigger RLF based on a combination of a number of consecutive HARQ-based DTXs and a time period being reached without reception from the relay WTRU. Such time difference may further depend on SLRB configuration and/or QoS.

In any of the examples described herein, successful reselection as a result of RLF and/or transmission/reception of an LPI message may depend on performing all actions within a configured time or timer. The WTRU may start a timer, whereby expiry of the timer prior to completion of the associated actions may result in a failed reselection procedure, or the WTRU may determine that when a time period has elapsed prior to completion of the associated actions may result in a failed reselection procedure. Such timer or time duration may further depend on any or a combination of QoS/SLRB configuration of the established service or services over the relay and/or CBR. Regarding QoS/SLRB configuration, for example, the source/relay WTRU may be configured with a reselection timer or reselection time duration associated with each SLRB. Upon triggering reselection, the WTRU may set a timer to the minimum value of the timer of each established SLRB, or consider the time duration to be the minimum value of the timer of each established SLRB. Regarding CBR, for example, the source/relay WTRU may be configured with a reselection timer or a reselection time duration associated with a range of CBRs. Upon triggering reselection, the WTRU may set a timer to the value associated with the measured CBR at the time of reselection trigger.

In any of the examples described herein, successful reselection may depend on the new relay supporting the SLRB configuration configured for the existing/old relay or a similar or equivalent configuration. Specifically, in some instances, a WTRU that triggers a relay reselection procedure to find a relay may only select such relay if the relay supports the SLRB configuration (possibly for those SLRBs configured for communication with the relay WTRU) that was configured prior to the reselection or an equivalent configuration.

In some embodiments, a WTRU that triggers relay reselection may perform the events described in the following paragraphs (potentially in sequence).

A WTRU may initiate a relay selection procedure, which may involve transmission/reception of a discovery message and/or link establishment message from upper layers. Alternatively, or additionally, the WTRU may rely on existing discovery message transmissions for the relay selection.

The WTRU may select a relay having the best RSRP measurements as a potential relay WTRU. The WTRU may also use upper layer criteria (e.g., service supported) for selection of the relay (e.g., support the relay with the best RSRP measurements for which upper layer services are supported). The WTRU may determine whether The WTRU may initiate a PC5-RRC configuration procedure with the peer WTRU (e.g., the selected potential relay WTRU). The WTRU may re-use the configuration of the bearers/PC5-RRC connection (e.g., SLRBs configuration for relaying) with the existing relay for configuration included in the PC5-RRC connection with the potential selected relay and/or for the TX-related parameters of the SLRB configuration. The WTRU may use the L2 source/destination ID provided by upper layers (associated with the potential new relay WTRU transmitting the discovery message) to transmit the PC5-RRC reconfiguration message and receive the response. Alternatively, or additionally, the WTRU may use a default L2 source/destination ID pair for relay reselection transmission, possibly also provided by upper layers. Alternatively, or additionally, the WTRU may use the L2 source/destination ID provided with the discovery message transmission/reception to the new potential relay for transmission of the PC5-RRC configuration message. Use of the same/similar configuration may include any of: using the same number of SLRBs; using the same configuration of one or more of the SLRBs, or a subset of parameters of the SLRBs, which may include TX-related parameters of the SLRB and/or parameters of the SLRB that are sent to the relay WTRU in the PC5-RRC reconfiguration message; using an equivalent configuration whereby such configuration is derived from the original configuration to take into account a change in any of the following characteristics of the new selected relay/path (where such information may be provided prior to relay selection, for example, in the discovery message, or for example, stored from previous session with that relay); difference in the number of hops between the old link and the new link; difference in the capability (e.g., number of carriers supported) of the new relay; and/or difference in the measurements reported by, or made of, the new relay. An equivalent configuration may be configured or pre-configured for each configuration from the network.

The WTRU may indicate a successful relay selection or reselection procedure to the upper layers if the PC5-RRC configuration procedure with the selected potential relay is successful. The WTRU may further perform any or a combination of the following subsequent actions: the WTRU may release the PC5-RRC context associated with the current relay WTRU; the WTRU may indicate, to upper layers, successful reselection to a relay WTRU and indicate the source/destination ID identifying the relay WTRU; the WTRU may create a new PC5-RRC connection associated with the new relay WTRU; and/or the WTRU may replace the source/destination ID associated with the current relay to the new source/destination ID associated with the relay WTRU in the PC5-RRC context of the current relay.

The WTRU may, upon reception of a failure in the PC5-RRC configuration response message, perform any of the following or a combination of any of the following subsequent actions. The WTRU may re-initiate a PC5-RRC reconfiguration procedure with another potential relay (e.g., potentially the relay WTRU having the next best RSRP). For example, the WTRU may repeat the PC5-RRC configuration procedure with multiple potential selected relays, in the order of best RSRP measurements, until a successful PC5-RRC reconfiguration procedure. For another example, the WTRU may repeat the PC5-RRC configuration procedure with any (e.g., randomly selected) potential relay WTRU for which the RSRP measurements satisfies some criteria (e.g., above a threshold) until a successful PC5-RRC reconfiguration procedure. For another example, the WTRU may repeat the PC5-RRC configuration procedure with different potential relays until all of the potential relays for which measured RSRP is above a threshold have been tried or until successful PC5-RRC reconfiguration procedure. For another example, the WTRU may repeat the PC5-RRC configuration procedure with different potential relays until expiry of a timer a given time duration is determined to have elapsed as described herein. Any combination of conditions in the above examples is possible for the WTRU behavior when determining whether to re-initiate a PC5-RRC reconfiguration procedure with another potential relay. The WTRU may indicate a reselection failure to upper layers upon at least one of exceeding the maximum number or time associated with reselection and/or following failed PC5-RRC reconfiguration with all of the potential relay WTRUs, possibly having RSRP above a threshold.

Figure 6:
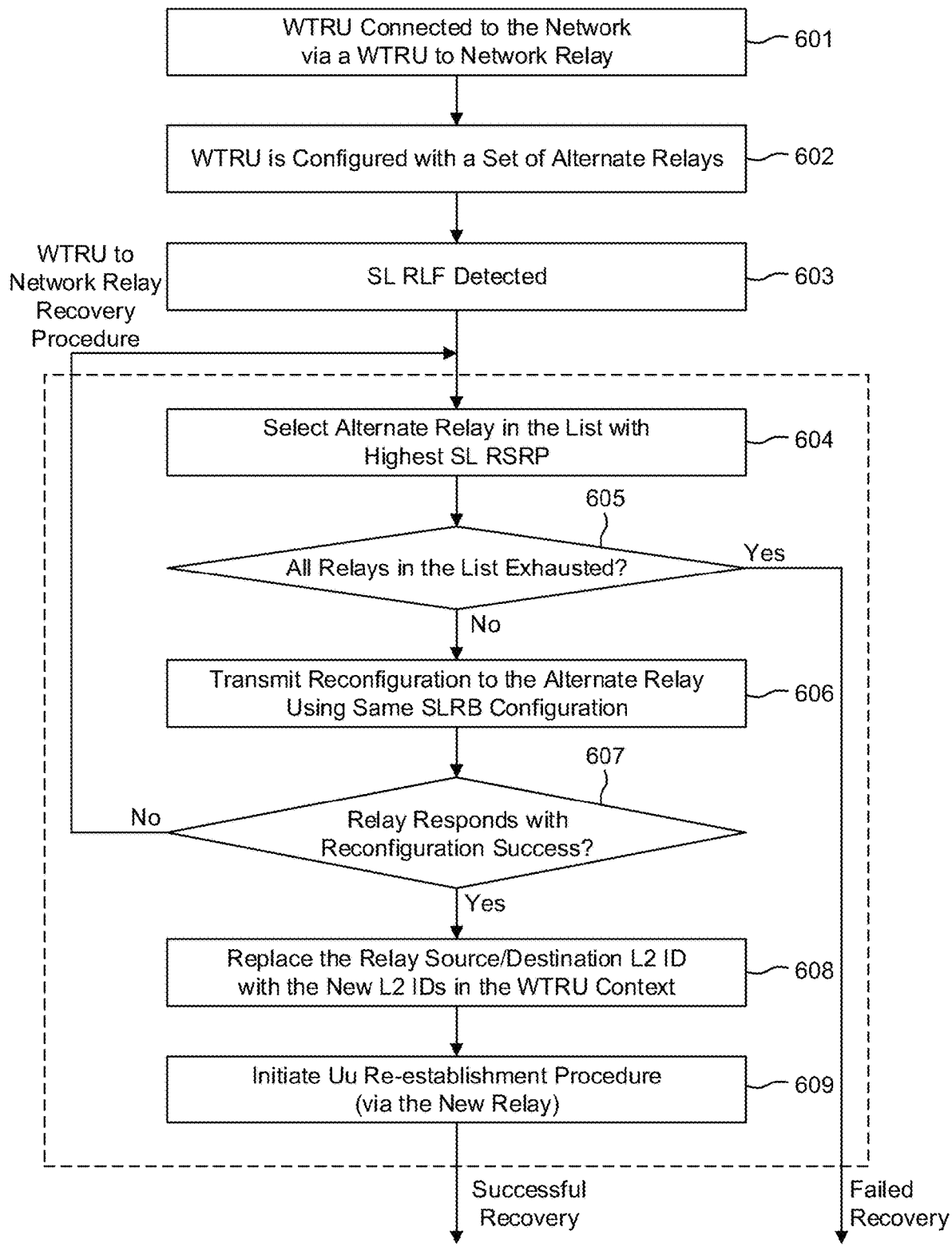
FIG. 6 is a flow diagram of an example re-establishment or recovery procedure.

FIG. 6 is a flow diagram of an example re-establishment or recovery procedure. As shown in FIG. 6 at 601, a remote WTRU may be connected to a network via a sidelink interface with a WTRU-to-network relay. The remote WTRU may be configured with a set of alternate relays, as shown at 602, for example, according to one or more other procedures described herein. As shown at 603, upon a determination that SL RLF has occurred (e.g., consistent with one or more procedures of the present description), while connected to a relay, the remote WTRU may then select a suitable relay, shown at 604. As shown in FIG. 6, such suitable relay may be the relay with the highest RSRP. Alternatively, or additionally, any suitable relay having SL RSRP above a threshold may be selected. The suitable relays may be those relays provided by the network in a configured list. The suitable relays may be those relays for which the measured SL RSRP is higher than a threshold, that satisfy some upper layer criteria associated with the discovery message, and that have an allowable PLMN. It should be appreciated that solutions according to embodiments not depicted may involve selection of one or more suitable relays according to procedures described herein. As shown at 605, if all relays from the set of alternate relays configured for the remote WTRU are exhausted, e.g., reconfiguration has failed for all alternate relays or otherwise a suitable alternate relay cannot be found, then the remote WTRU may determine that recovery has failed. If a suitable alternate relay can be found and selected, then, at 606, the remote WTRU may transmit an SL reconfiguration message to the selected relay to configure one or more of the SLRBs. The remote WTRU may use the same SLRB configuration (e.g., SL RLC channel for transmitting SLRB1, such as all SL RLC channels) that was previously configured at the remote WTRU with the previous relay. At 607, the remote WTRU may determine whether reconfiguration was successful, e.g., based on a response received from the selected alternate relay. For example, if the relay responds with a failure, or if the remote WTRU does not receive a response, the remote WTRU may retry the reconfiguration with a different suitable relay. The remote WTRU may retry such procedure until the list of suitable relays has been exhausted or until a timer associated with relay reselection is expired or until a determined time duration has elapsed. If reconfiguration for a newly selected relay is determined to be successful, e.g., based on a response received from the newly selected relay, at 608 the remote WTRU may update its current relay with the new L2 IDs of the newly selected relay and, at 609, transmit the Uu re-establishment request message using its existing SL RLC channel for SRB1 transmission, except that the L2 IDs may be changed for the new L2 IDs. Specifically, the remote WTRU may maintain the same configuration of the SL RLC channel or channels for transmission with the old relay as the new relay, with replacement of the L2 IDs.

In the example illustrated in FIG. 6, on a condition of failed recovery, the remote WTRU may delete its context and move to RRC_IDLE, trigger a relay reselection procedure, and/or trigger a cell reselection procedure. In embodiments, relay reselection may yield a new or different set of suitable relays compared with the NW provided set of relays.

In some embodiments, a WTRU may perform relay selection or re-selection and/or recovery (e.g., after RLF, for example) to a relay from a set of configured relay WTRUs provided by the network. Specifically, a WTRU may determine the relay WTRU to select, reselect or recover by selecting a WTRU within a list of WTRUs provided by the network. Such list may be provided directly via Uu (e.g., while the WTRU is in coverage). Alternatively, or additionally, such list may be provided by RRC signaling sent via the currently connected relay WTRU. A remote WTRU, upon detection of any condition defined herein (e.g., SL RLF with a relay WTRU), may select one of the relays in the list of relays provided by the network based on any or a combination of the following: measurements of the relay at the time of reselection or recovery, an ordering and/or priority associated with each relay and/or current location of the remote WTRU. Regarding measurements of the relay at the time or reselection or recovery, for example, the remote WTRU may select the relay WTRU on the list with the highest RSRP. For another example, the remote WTRU may select any relay WTRU with an acceptable RSRP (e.g., RSRP above a threshold). Regarding ordering and/or priority associated with each relay, for example, the remote WTRU may receive a preference and/or priority associated with each relay and may perform reselection/recovery to the relay WTRU associated with the highest priority. For another example, the remote WTRU may further combine other factors described herein (e.g., RSRP measurement of the relay) with such priority to determine the relay. Regarding current location of the remote WTRU, for example, the network may provide a set of allowed locations (e.g., zone IDs) for each relay WTRU and the remote WTRU may select the relay or relays that are associated with the current WTRU location (e.g., its current zone ID).

A WTRU may further receive from the network an SL configuration (PC5-RRC) to be used with each such relay WTRU upon recovery/reselection. Specifically, a remote WTRU may receive a PC5-RRC configuration applicable for recovery of an RRC CONNECTION via another relay WTRU. Such PC5-RRC configuration may be used to communicate with a reselected relay upon occurrence of any trigger/event described herein (e.g., SL-RLF).

A WTRU may initiate recovery to a relay WTRU, possibly to which the WTRU has a stored PC5-RRC configuration, by sending an initial activation message on SL, whereby such activation message may include one or more of: a dedicated activation PC5-RRC message, SL MAC CE, or SCI addressed to the L2 destination ID of the new relay; transmission of any UL or SL data whereby the WTRU may change the L2 destination ID to the L2 destination ID of the new relay; and/or a dedicated activation or a normal UL or SL transmission to a recovery L2 destination ID, or a special L2 destination ID configured at the remote WTRU for recovery. The relay WTRU, upon reception of such message, may activate a similarly stored configuration for reception/transmission to the remote WTRU.

A WTRU may be considered connected to the network via a WTRU-to-network relay if it has a PC5-RRC connection to a WTRU-to-network relay (e.g., it has a PC5-RRC context with a WTRU determined to be or specific for relaying). Specifically, a WTRU may stop performing a subset of procedures to the network and be considered connected via a relay upon one or more of indication from upper layers that a PC5-Link with a relay WTRU has been initiated and/or reception of a PC5-RRC message indicating a connection for relaying. For example, a WTRU may receive a PC5-RRC reconfiguration message containing an indication that the configuration is associated with a connection to a WTRU-to-network relay. For another example, a WTRU may receive a PC5-RRC reconfiguration message implicitly indicating a reconfiguration of a PC5-RRC connection for relaying due to the contents of the message. The PC5-RRC configuration message from the relay WTRU may include any of: configuration for an adaptation layer, configuration for mapping Uu QoS flows/bearers to SL protocol (e.g., RLC) entities/bearers, a mapping of Uu QoS entities to SL QoS entities, configuration for a Uu protocol layer (e.g., PDCP/SDAP), configuration/conditions for returning to Uu, and/or configuration for monitoring Uu while connected to the WTRU-to-network relay, including PDCCH configuration, Uu RLF configuration, and/or CQI reporting configuration. For example, a WTRU may receive a PC5-RRC message containing an embedded Uu RRC reconfiguration message configuring certain aspects of the Uu connection, as described herein.

Upon connection to a WTRU-to-network relay, such WTRU may stop performing certain procedures to Uu. For example, the WTRU may stop monitoring RLF on Uu (legacy RLF) and start a relay-based link monitoring procedure with the relay WTRU. The WTRU may also perform a new or limited RLF procedure with the network (on Uu) as described herein. For another example, the WTRU may stop reception of system information from the network and receive system information from the relay WTRU. For another example, the WTRU may stop monitoring of paging and receive paging from the peer WTRU. For another example, the WTRU may stop monitoring PDCCH from the network for DL assignments and UL grants. Alternatively, or additionally, the WTRU may perform some limited PDCCH monitoring, as described herein. For another example, the WTRU may suspend all DRBs. For another example, the WTRU may replace some or all DRBs with corresponding relayed DRBs. For another example, the WTRU may create relayed DRBs corresponding to the Uu DRBs, which may be suspended.

A WTRU connected via a WTRU-to-network relay may trigger a relay RLF procedure upon detection of RLF associated with the WTRU-to-network relay. Such detection may be as a result of any of the triggers described herein.

A WTRU, upon triggering RLF associated with the WTRU-to-network relay, may perform any or a combination of any of the following actions. For instance, a WTRU may release the PC5-RRC context associated with the WTRU-to-network relay. A WTRU may release the protocol entities (e.g., adaptation layer) for routing between SL and Uu. A WTRU may release SL bearers (e.g., signaling and/or data SL bearers). If the WTRU is in network coverage or has not triggered RLF with respect to the network, a WTRU may restore its Uu context, including any suspended Uu bearers. If the WTRU is in network coverage, or has not triggered RLF with respect to the network, a WTRU may release routing of Uu bearers via SL bearers/channels and resume transmission of or transmit data from its Uu QoS flows via Uu bearers. If the WTRU is in network coverage, a WTRU's SDAP and/or PDCP layer may re-route QoS flows/bearers from the SL to the Uu. A WTRU may initiate WTRU-to-network relay reselection. If the WTRU is in network coverage or has not triggered RLF with respect to the network, the WTRU may resume the normal Uu procedures that were suspended upon connection to the WTRU-to-network relay. If the WTRU is in network coverage, or has not triggered RLF with respect to the network, the WTRU may perform an access procedure to the network as described herein. If the WTRU is in network coverage or has not triggered RLF with respect to the network, a WTRU may initiate decoding of PDSCH for transmissions by the network. If the WTRU is in network coverage or has not triggered RLF with respect to the network, a WTRU may resume any suspended Uu radio bearers.

In some embodiments, a WTRU connected to a WTRU-to-network relay may initiate a link monitoring procedure based on reception of discovery from the connected relay WTRU. A WTRU may further determine which reception to use for link monitoring based on an indication in the SCI (e.g., where the SCI contains an indication that the associated data contains discovery transmission) or based on an indication in the MAC header (e.g., where the MAC header indicates data for a logical channel associated with discovery). Specifically, the remote WTRU may perform RSRP measurements on discovery transmissions by the relay WTRU and determine whether to declare RLF based on the measured RSRP and/or perform BLER calculation based on received RS in the discovery transmission and possibly other transmissions as well. Regarding performing RSRP measurements, for example, a WTRU may declare RLF of the relayed connection if the RSRP of the relay discovery transmissions fall below a threshold, possibly for a period of time. For another example, a WTRU may declare RLF of the relayed connection if the RSRP of the relay discovery transmissions change by at least a threshold, and possibly remain so for a period of time. Regarding performing BLER calculation, for example, a WTRU may determine a PSCCH BLER from the RS received in the SCI associated/containing discovery messages (e.g., SCI indicating discovery transmission). A WTRU may count a number of consecutive OOS (e.g., BLER below a threshold) events and may start an RLF timer when the number of OOS reaches a value, or in other words, the WTRU may determine whether a time duration associated with RLF has elapsed. At expiry of a timer without a number of recovery events (e.g., BLER above a threshold), or when the time duration has elapsed, the WTRU may trigger RLF. A WTRU may further determine the periodicity of IS/OOS determination and/or indication to upper layers based on the configured discovery transmission period of the WTRU or of the relay (e.g., obtained via PC5-RRC).

In some embodiments, a WTRU may perform monitoring of the PDCCH while connected to a relay WTRU. Such monitoring may be periodic and/or sparse. This may ensure minimal power consumption associated with PDCCH monitoring. For example, the WTRU may perform some DRX-like monitoring of the PDCCH while connected to the relay WTRU. For example, the WTRU may monitor the PDCCH on one or more slots with a configured or pre-configured periodicity.

In some embodiments, a WTRU may be configured to enable/start DRX with the NW upon initiation of a connection with a WTRU-to-network relay. The WTRU may receive such configuration for DRX from the network before connection with the WTRU-to-network relay (e.g., via SIB or dedicated RRC signaling). Alternatively, or additionally, the WTRU may enable DRX upon reception of a DRX configuration via the relay WTRU (e.g., on PC5-RRC) following establishment of the PC5-RRC connection with the relay WTRU.

A WTRU may be configured to receive a wakeup signal (WUS) that may control the monitoring of PDCCH versus PSCCH. For example, the WUS may determine whether to monitor PDCCH instead of PSCCH (or vice versa, for a period of time (e.g., the DRX cycle). For example, a WTRU may monitor for WUS over Uu at a configured or pre-configured time. If the WUS is detected, the WTRU may monitor PDCCH for the DRX cycle. Otherwise, as in some embodiments, it may skip the DRX cycle and continue to monitor SL only.

A WTRU may determine the intensity of PDCCH monitoring while connected to the WTRU-to-network relay based on measurements/criteria associated with the PC5-RRC connection with the relay WTRU. For example, the intensity of monitoring of PDCCH may include any of the periodicity of PDCCH monitoring, the bandwidth or PDCCH monitored, the number of consecutive slots monitored each period and/or the search space or spaces associated with the PDCCH monitored.

A WTRU may determine the intensity of PDCCH monitoring based on any of the measured and/or reported RSRP on SL to the relay WTRU and/or the value of any parameter, counter of timer related to SL RLF, or expiration of a time duration related to SL RLF. Regarding the measured and/or reported RSRP on SL to the relay WTRU, for example, a WTRU may be configured or pre-configured with a mapping between measured/reported RSRP range and periodicity of PDCCH monitoring. The remote WTRU may be configured to report SL RSRP measurements to the relay WTRU. The relay WTRU may in-turn forward such RSRP measurements to the network. Alternatively, or additionally, the relay WTRU may send the RSRP measurements (or an indication of the level of such measurements) only when such measurements change from a first level to a second level corresponding to a change in the intensity of the PDCCH monitoring of the remote WTRU. Regarding the value of any parameter, counter, timer, or time duration related to SL RLF, for example, the WTRU may be configured with PDCCH decoding intensity for when a T310-like timer associated with SL link monitoring is running or when a time duration associated with SL link monitoring has not elapsed, and another for when a T310-like timer is not running or when a time duration associated with SL link monitoring has elapsed. For example, the WTRU may be configured with a PDCCH decoding intensity for when the number of HARQ-DTX (either consecutive or within a window) is below a threshold and a number of HARQ-DTXs (either consecutive or within a window) is above a threshold.

A WTRU may trigger a relay RLF procedure upon any of the following conditions relayed to a reception on Uu: reception of scheduling on PDCCH (e.g., a DCI scheduled with the WTRU's C-RTNI or a new RNTI indicating a resumption of NW-based scheduling), where such scheduling may be for UL and/or DL data transmission on Uu; reception of an RRC message resuming Uu-based (e.g., non-relayed) operation, where such RRC message may be received directly on the Uu link; reception for a MAC CE on Uu; reception of the WTRU at the configured Uu monitoring occasion; and/or explicit indication from the network in any of the above signaling mechanisms (e.g., an RRC message with an explicit indication to trigger SL RFL or a WUS with an explicit indication to trigger SL RLF). Regarding reception of an RRC message resuming Uu-based operation, for example, a WTRU, when connected to a WTRU-to-network relay, may suspend all Uu DRBs and may maintain SRBs. The WTRU may trigger relay RLF and resume DRBs when it receives an RRC message from the network over an SRB via Uu.

A WTRU may perform RLF-like operations on Uu and SL simultaneously. A WTRU may inform the network of RLF on one of the links via the other link. For example, upon detection of SL RLF with the relay WTRU, a remote WTRU may perform an access procedure that may include any of performing a RACH procedure (potentially if the TAT has expired) and/or transmission of an RRC message, such as SLUEInformation, RRCResume, or UEAssistanceInformation, or another logically equivalent message. A WTRU may further indicate the occurrence of the SL RLF within such message. Upon detection of Uu RLF, the WTRU may inform the network via transmission of a Uu RRC message via the relay WTRU (e.g., encapsulated in PC5-RRC) of such RLF.

A WTRU may trigger a re-establishment procedure following RLF while connected to a WTRU-to-network relay. In such procedure, the WTRU may indicate the relay WTRU (e.g., the L2 source/destination ID) in the re-establishment request message. Upon detection of Uu RLF and/or failed re-establishment, the WTRU may operate as though it is out of coverage.

In some embodiments, a WTRU may release a PC5-RRC connection (e.g., release all context associated with the PC5-RRC connection with the relay, and inform upper layers) upon any of Uu RLF that results in reselection to a cell for which the existing relay is not supported, reception of a re-establishment response and/or any re-establishment procedure. Regarding Uu RLF that results in reselection to a cell for which the existing relay is not supported, for example, a WTRU may be configured or pre-configured with a set of relays that can be used on the cell, and the WTRU may trigger PC5-RRC release if the selected cell does not support the current relay WTRU. Regarding reception of a re-establishment response, for example, a WTRU may receive an indication to release the PC5-RRC connection in a re-establishment response message. Regarding any re-establishment procedure, for example, a WTRU may be configured to release the PC5-RRC connection upon trigger of the Uu re-establishment procedure.

In some embodiments, a remote WTRU may be configured to perform Uu CSI measurements when connected to a relay WTRU and in coverage of the network. The remote WTRU may transmit the CSI measurements to the relay WTRU. Additionally, a relay WTRU may be configured to forward received CSI measurements to the network.

A remote WTRU may be configured by RRC signaling (e.g., directly on Uu or via RRC encapsulated within PC5-RRC) to measure CSI on Uu. Alternatively, or additionally, the remote WTRU may be configured with a condition for measuring/sending the CSI measurements, based on any or a combination of the measured quality of the relay WTRU, the measured quality on Uu, the presence of another relay, location of the remote WTRU and/or relay WTRU, and/or QoS and/or other bearer configuration. Regarding the measured quality of the relay WTRU, for example, the remote WTRU may perform/transmit Uu CSI measurements when the relay RSRP falls below a threshold. For another example, the remote WTRU may perform/transmit Uu CSI measurements when the relay RSRP is between a first threshold and a second threshold. For another example, the remote WTRU may perform/transmit Uu CSI measurements when the relay RSRP changes by an amount. Regarding the measured quality on Uu, for example, the remote WTRU may perform/transmit Uu CSI measurements when the Uu RSRP is above a threshold. For another example, the remote WTRU may perform/transmit Uu CSI measurements when the Uu RSRP is between a first threshold and a second threshold. Regarding the presence of another relay, for example, the remote WTRU may perform/transmit Uu CSI measurements when there are no other detected potential relays with measured RSRP above a threshold. Regarding location of the remote WTRU and/or relay WTRU, for example, the remote WTRU may be configured with a set of zones within which it should report CSI measurements. For example, the remote WTRU may report CSI measurements based on the reported zone of the relay WTRU, possibly in combination with its own location (e.g., if the distance exceeds some configured or pre-configured value or some function of a QoS parameter (e.g., the range parameter). Regarding QoS and/or bearer configuration, for example, the remote WTRU may determine to report CSI measurements based on the QoS of the data being transmitted or based on some configuration aspect related to the currently configured/established bearers.

A remote WTRU may transmit CSI measurements of the network to the relay WTRU via MAC CE or a logically equivalent message. Alternatively, or additionally, the remote WTRU may transmit CSI measurements of the network to the relay via PC5-RRC messages. Alternatively, or additionally, the remote WTRU may transmit CSI measurements of the network in a Uu RRC message encapsulated within a PC5-RRC message, or any logically equivalent message.

In some embodiments, the remote WTRU may transmit CSI measurements to the relay WTRU via a MAC CE. The remote WTRU may determine a time requirement for the CSI measurements based on one or a combination of being configured by the network, based on its speed, based on CBR/CR measured at the remote WTRU and/or indicated by the relay WTRU, and/or based on flow control indication/information provided by the relay WTRU. The remote WTRU may drop a CSI measurement if the time since the trigger of the CSI measurement exceeds a threshold.

The remote WTRU may include, in the CSI measurement report/CQI report: the CQI, a trigger type (e.g., periodic vs event-based CQI report, a priority indication and/or a timestamp corresponding to the time in which the Uu CSI measurement was triggered. Regarding the priority indication, for example, the remote WTRU may set a priority indication based on the trigger that generated the CQI report (e.g., periodic vs event-based CQI report). For example, the remote WTRU may set a priority indication based on the time between when the CSI measurement was triggered and the time in which the CQI report was constructed/transmitted.

In some embodiments, a relay WTRU may transmit a CSI measurement from one or more remote WTRUs to the network. For example, a relay WTRU may transmit a MAC CE or RRC message (or another logically equivalent message) to the network containing the CQI measurements received from one or more remote WTRUs.

In some embodiments, the relay WTRU may transmit a MAC CE or a logically equivalent message including the CSI report from one or more remote WTRUs. Such message may include the CQI and/or the destination ID of the remote WTRU to which the CQI belongs.

The relay WTRU may assign a fixed or preconfigured priority to the CQI MAC CE or equivalent CQI message. Alternatively, or additionally, the relay WTRU may determine the priority of the CQI MAC CE based on one or more of a timestamp received from the remote WTRU for the associated CQI, a priority received from the remote WTRU associated with the CQI, and/or the trigger type of the SL CQI.

A relay WTRU may trigger a MAC CE for forwarding CSI measurements upon any of reception of a Uu CQI report from any remote WTRU and/or upon expiry of a timer, where such timer may be started upon reception of a Uu CQI report from any remote WTRU. For example, a relay WTRU may set a timer upon reception of a Uu CQI report from a remote WTRU if such timer is not running. The relay WTRU may trigger transmission of the CSI measurements of that remote WTRU, along with any other CQI reports received (possibly from other WTRUs) while the timer is running. The relay WTRU may further transmit a CQI report immediately upon reception (e.g., prior to expiry of a running timer or before a time duration has elapsed) based on certain conditions associated with the received CQI report (e.g., upon reception of a CQI report having a specific value of the trigger type, priority indication and/or timestamp).

In some embodiments, a WTRU may store the Uu configuration with the cell to which the WTRU was connected upon establishment of the WTRU-to-network relay connection. The WTRU may re-use such stored configuration as part of the recovery procedure triggered (e.g., when the relay link fails) based on any conditions described herein. Alternatively, or additionally, a WTRU may have multiple stored candidate Uu cell configurations with different cells. The WTRU may receive such candidate cells via dedicated RRC signaling on Uu and/or via the relay WTRU. The WTRU may also re-use such stored configurations as part of the recovery procedure.

A stored candidate Uu cell configuration may be configured explicitly for recovery when connected to a WTRU-to-network relay. Additionally, or alternatively, a candidate Uu cell configuration may be configured for the WTRU for other purposes while the WTRU is connected via Uu (e.g., conditional handover (HO) candidate cells or conditional PSCell change candidate cells).

A WTRU may determine the validity of a stored Uu candidate configuration based on any of the relay WTRUs to which a remote WTRU is connected prior to the recovery action and/or one or more identifiers broadcast by the relay WTRU or broadcast by the network but relayed by the relay WTRU. Regarding the relay WTRU to which a remote WTRU is connected prior to the recovery action, for example, a remote WTRU may be configured with an association between a stored Uu candidate configuration and one or more relay WTRUs (e.g., identified by a WTRU ID such as destination ID, C-RNTI, or similar/new ID). A remote WTRU may consider a stored Uu candidate configuration to be valid for recovery if the relay WTRUE to which the WTRU was connected upon trigger of the recovery was associated with such candidate configuration. For example, a remote WTRU may receive, from a relay WTRU, the list of valid stored candidate cells, and the WTRU may consider the stored configuration for each cell as valid when recovery is triggered following connection to that relay WTRU. Regarding one or more identifiers broadcast by the relay WTRU, or broadcast by the network but relayed by the relay WTRU, for example, a remote WTRU may receive an identifier from the relay WTRU (either directly, such as in PC5-RRC, or indirectly, by forwarding a Uu RRC message or IE from the network). The remote WTRU may further be configured with a set of valid cell configurations for a given identifier or a set of identifiers to be received to consider a cell configuration to be valid for recovery while connected to that relay. For example, such identifier may correspond to the RAN area ID relayed by the relay WTRU in system information.

A remote WTRU may delete a stored Uu candidate configuration/cell upon reselection to a relay WTRU for which such stored candidate configuration/cell is invalid. Alternatively, or additionally, a WTRU may store all configured candidate configurations, but may consider only the valid stored cell configuration or configurations as part of the recovery procedure.

A WTRU may perform a recovery procedure via Uu (e.g., a CHO procedure or similar) using the stored Uu configuration following any SL related condition triggering recovery, as described herein. A WTRU may further perform such recovery procedure upon any or a combination of the following conditions: the WTRU performs a cell reselection to a cell for which the WTRU has a valid stored Uu candidate configuration; the cell to which reselection is performed has a certain quality (e.g., RSRP above a threshold); and/or the WTRU detects a cell with a certain quality (e.g., RSRP above a threshold) for which the WTRU has a stored valid Uu candidate configuration.

In some embodiments, a WTRU may prioritize a cell with a stored valid candidate configuration when performing recovery. In the absence of any or all of the above conditions, a WTRU may skip any recovery procedure and perform normal re-establishment procedure.

The cell selection/relay selection procedure may depend on factors associated with the re-establishment trigger. Such factors may include, for example: Uu measurements at the time of re-establishment, such as Uu RSRP; SL measurements, such as CBR; whether one procedure has been triggered or was already triggered at the initiation of the reestablishment; support of relaying by the cell on which reestablishment is triggered (e.g., cell originates from a relay capable NodeB, e.g., a gNB); and QoS associated with bearers currently active, or any configuration of the bearers/LCHs.

A remote WTRU may trigger a cell selection or relay selection procedure when connected directly via Uu and/or when connected via a relay WTRU. Such cell/relay reselection procedure may be associated with triggers that would normally trigger Uu re-establishment in Uu. For example, the remote WTRU, upon triggering Uu RLF, may initiate a re-establishment procedure, taking into account a possible relay WTRU. Such new re-establishment procedure may start with initiation of a cell reselection and/or relay selection procedure. Either or both of cell reselection or relay reselection may be initiated.

A remote WTRU may perform a cell selection, cell reselection, relay selection and/or relay reselection procedure in sequence (e.g., perform one first, then perform the other). In such case, the remote WTRU may determine an order for such procedures. Alternatively, or additionally, the remote WTRU may perform the two procedures in parallel. For example, the remote WTRU may initiate re-establishment to a relay WTRU or directly to a cell depending on which of the relay reselection or cell reselection procedures completed first (and provided a suitable cell/relay).

A WTRU may determine whether to perform none, either or both cell selection or relay selection and/or which to perform first based on any or a combination of the following factors: whether the current cell supports relaying configuration (e.g., whether the relay is capable, for example, of broadcasting relay-specific information, which may be associated with an L2 relay, in its SIB); whether a WTRU is PC5-RRC connected to a relay WTRU; whether the remote WTRU is connected via Uu or connected via a relay WTRU; whether the WTRU already initiated a relay reselection procedure (e.g., due to another trigger, such as Uu RSRP, or as a result of some explicit/implicit indication by the network to start such reselection); based on the current Uu RSRP measurements (e.g., in relation to a threshold); based on network configuration; and/or based on SL measurements.

Regarding whether the current cell supports relaying configuration, for example, if the current cell supports relaying configuration, the remote WTRU may initiate relay selection (e.g., before or after cell selection) as part of the reestablishment procedure. Regarding whether a WTRU is PC5-RRC connected to a relay WTRU, for example, if the remote WTRU is PC5-RRC connected to a relay WTRU at the occurrence of the trigger (e.g., Uu RLF), the remote WTRU may not perform either of cell selection or relay selection. For another example, if the remote WTRU is not PC5-RRC connected to a relay WTRU at the occurrence of the trigger (e.g., Uu RLF), the remote WTRU may initiate relay selection.

Regarding whether the remote WTRU is connected via Uu or connected via a relay WTRU, for example, the remote WTRU may perform cell reselection before relay reselection when triggering the reestablishment procedure while connected via a relay (and vice versa). In some instances, the remote WTRU may perform only relay selection (and not cell selection) when connected via a relay (and vice versa). Regarding whether the WTRU already initiated a relay reselection procedure (e.g., due to another trigger, such as Uu RSRP, or as a result of some explicit/implicit indication by the network to start such reselection), if the remote WTRU has already initiated a relay reselection procedure, the remote WTRU may not trigger either cell/relay reselection procedures or may trigger only a cell reselection procedure. Otherwise, as in some instances, the remote WTRU may trigger relay reselection or trigger both procedures. For example, a remote WTRU may trigger relay reselection when Uu RSRP goes below a threshold and/or when the network sends an indication to trigger reselection. Such trigger or triggers may occur before the initiation of re-establishment. If a suitable relay was already found before the re-establishment trigger, the remote WTRU may not trigger cell and/or relay reselection. If the remote WTRU has a PC5-RRC connection to a suitable relay, the remote WTRU may not trigger cell and/or relay reselection.

Regarding determining whether to perform none, either or both cell selection or relay selection and/or which to perform first based on the current Uu RSRP measurements, for example, if the Uu RSRP measurements are below a threshold at the trigger of RLF, the remote WTRU may trigger relay selection before cell selection. Otherwise, it may trigger cell selection before relay selection. For example, if the Uu RSRP measurements are below a threshold at the trigger of RLF, the remote WTRU may trigger relay selection in addition to cell selection. Otherwise, the remote WTRU may trigger only cell selection.

Regarding determining whether to perform none, either or both cell selection or relay selection and/or which to perform first based on a network configuration, for example, the remote WTRU may be configured with an order of cell selection/relay selection. Such configuration may be explicit (e.g., an indicator in SIB or dedicated RRC) or may be tied based on some rule to another network configuration aspect. For example, the WTRU may be configured with a bearer/QoS flow for which the WTRU should initiate one or the other selection procedure, which may be in a specific order.

Regarding determining whether to perform none, either or both cell selection or relay selection and/or which to perform first based on SL measurements, for example, the remote WTRU may perform cell selection only, or cell selection before relay selection, if the measured CBR is above a threshold. Otherwise, the remote WTRU may perform both cell selection and relay selection or perform relay selection before cell selection.

A remote WTRU may use a single timer (e.g., similar to T311), or determine whether a time duration has elapsed, for both cell selection and relay selection. For example, the remote WTRU may start a timer (T3XX) upon the re-establishment trigger and, upon failure to find either a suitable cell or a suitable relay before a time duration has elapsed, may move to RRC_IDLE. The value of the T3xx timer or time duration may depend on whether the WTRU is configured to perform both cell selection and/or relay selection. For example, the remote WTRU may use a first timer or time duration when configured to perform cell selection only, may use a second timer or time duration when configured to perform relay selection only, and may use a third timer or time duration when configured to perform both cell selection and relay selection. Additionally, a remote WTRU may use a different timer or time duration depending on whether cell selection and relay selection are performed in parallel or sequentially, based on the conditions described herein.

In some embodiments, a remote WTRU may be configured with separate timers or time durations for cell selection and relay selection. For example, a remote WTRU may trigger relay selection upon expiry of T311 (e.g., failed cell selection procedure) or upon a determination that a time duration has elapsed. Alternatively, or additionally, a remote WTRU may trigger cell selection upon expiry of a relay selection related timer (T3yy) or upon a determination that a time duration associated with relay selection has elapsed.

A remote WTRU may stop the T311-like timer upon selection of a cell or a relay (depending on which is found first). Alternatively, or additionally, the remote WTRU may continue the T311-like timer until the remote WTRU selects/finds both a relay and a cell. For example, if the remote WTRU finds a cell upon starting T311, and T311 has not expired, the remote WTRU determines a time duration has not elapsed, the remote WTRU may start/continue relay selection until a suitable relay is also found. Alternatively, or additionally if the T311-like timer or the time duration expires, the remote WTRU may initiate re-establishment to the suitable cell at the expiry of the timer or time duration.

A remote WTRU may be associated with different parameters for cell/relay reselection depending on the factors associated with the re-establishment trigger. For example, such parameters may include the RSRP threshold (e.g., Uu threshold for cell suitability or SL RSRP threshold for relay suitability). For example, a remote WTRU may use a different threshold or may apply an offset to such threshold depending on the factors mentioned herein.

For example, the remote WTRU may determine such threshold based on the current Uu RSRP measurements. For example, the remote WTRU may set the SL RSRP threshold for determining whether a relay is suitable to a higher value when the Uu RSRP at the time Uu RLF/Re-establishment is triggered is higher.

In some examples, the remote WTRU may perform re-establishment to a predetermined/selected relay. Upon one or more triggers relating to re-establishment (e.g., Uu RLF, SL-RLF), a remote WTRU may perform reestablishment to a predetermined or predefined relay WTRU. For example, a remote WTRU may immediately perform re-establishment to a relay WTRU without relay selection procedure and/or cell selection procedure. The relay WTRU may be determined based on network signaling/configuration, based on existing PC5-RRC connection, based on measurements reported to the network, and/or based on a previous relay selection procedure.

Regarding determining the relay WTRU based on NW signaling/configuration, for example, a remote WTRU may be provided with one or more relay WTRUs in a Uu RRC message (or another logically equivalent message) and may perform re-establishment to any of the one or more provided relay WTRUs. Regarding determining the relay WTRU based on existing PC5-RRC connection, for example, a remote WTRU may perform re-establishment with a relay WTRU if it is already PC5-RRC connected to a relay WTRU.

Regarding determining the relay WTRU based on measurements reported to the network, for example, a remote WTRU may be configured with RRM-like measurements of SL relays. A remote WTRU may trigger a re-establishment, directly to a relay WTRU, which is within the list of relays reported by the WTRU to the network in the reported measurements.

Regarding determining the relay WTRU based on a previous relay selection procedure, for example, if a remote WTRU has already selected a suitable relay, the remote WTRU may initiate re-establishment to the relay without performing cell/relay reselection.

A remote WTRU may perform re-establishment via a relay or directly via Uu. In one example, the WTRU may determine this based on the first suitable entity (e.g., cell or relay) that is determined at the remote WTRU. For example, the remote WTRU may run both cell selection and relay selection simultaneously and may select the first entity that is suitable to initiate re-establishment. For example, the remote WTRU may be configured with a sequential ordering to perform cell selection versus relay selection. For example, if the remote WTRU performing relay selection finds a suitable relay (e.g., SL RSRP above a threshold, meeting higher layer criteria, and the relay is connected to an allowed PLMN for the remote WTRU) before the remote WTRU performing cell selection finds a suitable cell (e.g., Uu RSRP above a threshold and allowed PLMN), the remote WTRU may initiate re-establishment via the relay.

In another example, the WTRU may be configured with a preference/priority for re-establishment via a relay or direct if both the relay and the cell are determined suitable. For example, if both a suitable relay and a suitable cell are selected, the remote WTRU may select one of them based on priority. The remote WTRU may re-establish via direct if it is configured with direct as a higher priority than via relay (or vice versa). The remote WTRU may prioritize re-establishment via direct if it was previously connected via direct. The remote WTRU may prioritize re-establishment via a relay if it was previously connected via a relay. The remote WTRU may re-establish via direct if the selected cell is a conditional handover candidate configured at the WTRU. Otherwise, as in some embodiments, the remote WTRU may use other selection rules discussed herein. The remote WTRU may re-establish via relay if the relay WTRU is connected to a cell that is a conditional handover candidate of the remote WTRU.

A remote WTRU may be configured with different values of the re-establishment timer or time durations for re-establishment and may determine which timer or time duration to use depending on factors associated with the re-establishment. For example, a remote WTRU may determine the value of the re-establishment timer (T301) or time duration depending on any of the following factors: whether re-establishment is performed via a relay or via direct (Uu), whether re-establishment is triggered when an existing PC5-RRC connection exists with the relay or whether such PC5-RRC connection needs to be established before the remote WTRU can send re-establishment via the relay, whether the network previously provided one or more relays that were usable for re-establishment, and/or whether the remote WTRU performs re-establishment using a single hop or multi-hop relay. For example, a relay WTRU may announce the number of hops in the discovery message, and the remote WTRU may select the value of T301 or the time duration based on the announced number of hops.

A remote WTRU may include, in the re-establishment request message, an identification of the relay WTRU to which the remote WTRU was previously connected, an identification of the relay WTRU to which the remote WTRU was previously connected and/or indication of whether re-establishment was triggered when the remote WTRU was connected via Uu or via a relay. For example, the remote WTRU may include an explicit indication of the previous connection interface. For example, the remote WTRU may use different re-establishment cause values for indicating that the failure that triggered re-establishment occurred while directly connected via Uu or connected via a relay.

A relay WTRU may determine a cause value (establishment cause, resume cause, re-establishment cause) included in its own connection establishment/resume/reestablishment signaling with the network. A relay WTRU may use a dedicated cause value for relay WTRU connection establishment/resume resulting from a remote WTRU attempting to access the network. Alternatively, a relay WTRU may re-use some of the existing cause values currently defined, both for its own access as well as the access attempts initiated by a remote WTRU.

In embodiments, a relay WTRU may determine the cause value for its own establishment/reestablishment/resume operation based on a property or characteristic of the remote WTRU's own transmission. Such remote WTRU transmission may further be associated with a transmission that initiated the connection by the relay WTRU, for example. Such property or characteristic may include any or a combination of the RLC channel on which data is received from a remote WTRU, a Uu RRC message/procedure triggered by the remote WTRU, a resource of subset of resources (e.g., time or frequency) on which data is received from the remote WTRU, and/or explicit signaling from the remote WTRU.

Regarding the RLC channel on which data is received from a remote WTRU, for example, a relay WTRU may be configured, preconfigured or predefined to use a first cause value for connection establishment/reestablishment/resume that is triggered by reception of data from a first RLC channel and a second cause value when triggered by reception of data from a second RLC channel. For example, the specific cause value to use by the relay WTRU may be predefined as part of the RLC channel configuration. For example, the remote WTRU may select a specific SL-RLC channel for transmission associated with different cause values determined at the remote WTRU. For example, the remote WTRU may transmit Uu data to be relayed over sidelink on a first SL RLC channel when the data is associated with one or more first cause values (e.g., emergency access) and may use a second RLC channel when data is associated with one or more second cause values (e.g., other cause values).

Regarding a Uu RRC message/procedure triggered by the remote WTRU, for example, the relay WTRU may use a first cause value for connection establishment procedure triggered by the remote WTRU, a second cause value for a connection re-establishment procedure, and a third cause value for a resume procedure. The relay WTRU may determine the procedure being performed by the remote WTRU using information from the remote WTRU using other embodiments (e.g., RLC channel, explicit signaling, etc.), which may indicate the procedure and/or knowledge of the remote WTRU's RRC state. For example, the relay WTRU may determine the procedure to be a connection establishment procedure when it receives data on an SL-RLC channel associated with SRB0. For example, the relay WTRU may determine the procedure to be resumed when an SL-RLC channel for SRB1 is used and the remote WTRU is in RRC_INACTIVE and may determine the procedure to be a reestablishment when data is received on an SL-RLC channel for SRB1 and the remote WTRU is in RRC_CONNECTED. The relay WTRU may determine the RRC state of the remote WTRU from the remote WTRU or from the network. For example, the remote WTRU may indicate (e.g., explicitly or using other methods described herein) the specific procedure being initiated by the remote WTRU (e.g., resume, connection establishment, or connection reestablishment).

Regarding resource or subset of resources on which data is received from the remote WTRU, for example, a remote WTRU may be configured or preconfigured with a set of time/frequency resources on which it can send transmissions associated with different access categories and/or cause values. For example, a remote WTRU may be configured or preconfigured to select a first cause value when it receives a transmission on a remote WTRU, which may be associated with one or more predefined RLC channels, on a specific configured or preconfigured set of resources, and may select a second cause value when it receives a transmission on a second set of resources.

Regarding explicit signaling from the remote WTRU, for example, a remote WTRU may send the cause value for its own connection establishment/reestablishment/resume signaling on the Uu to the relay WTRU. For example, the remote WTRU may send an SL MAC CE, adaptation layer control message, SL RRC message, PHY signal (e.g., SCI) or other explicit signaling indicating the establishment cause. For example, the remote WTRU may send an explicit indication when its establishment cause is one or a subset of values. The relay WTRU may select its own establishment cause from the establishment cause received from the remote WTRU. For example, a remote WTRU may send an indication on SL (e.g., in an SL MAC CE, SL RRC message or SCI) when the access by the remote WTRU is associated with a specific cause value (e.g., emergency access). In that case, the relay WTRU may use a first cause value (e.g., emergency access) while it may use a second cause value (e.g., a new cause value) for other cases. For example, a remote WTRU may send the cause value for its own connection establishment//reestablishment/resume on Uu to the relay WTRU. If the cause value is one of a subset of cause values, the relay WTRU may use a first cause value (e.g., emergency access), while the relay WTRU may use a second cause value (e.g., new cause value) otherwise.

A relay WTRU may use a new cause value or an existing cause value for its own access, depending on the cause value (or information thereof) received from the remote WTRU. For example, a relay WTRU may be configured or preconfigured with a mapping of remote WTRU cause values to relay WTRU cause values and may select its own cause value based on this mapping. Such mapping may further depend on, for example, an RRC state of the remote/relay WTRU, the relay WTRU's own access category, access categories of other remote WTRUs connected to the relay WTRU (which may be in a particular RRC state, network preference, configuration and/or measurements of sidelink (e.g., CBR, CR, SL, RSRP and/or resource load at the relay).

Regarding RRC state of the remote/relay WTRU, for example, the relay WTRU may be configured with a different mapping depending on the RRC state of the remote WTRU or its own RRC state. Regarding the relay WTRU's own access category, for example, the relay WTRU may be configured with a different mapping depending on the access category of the relay WTRU. Regarding access categories of other remote WTRUs connected to the relay WTRU, for example, the relay WTRU may be configured with a different mapping depending on the highest/lowest access category of other remote WTRUs, for example, where such remote WTRUs may be in a specific RRC state. For example, the relay WTRU may determine the cause value based on a mapping of the received cause value (or cause value information) to a relay cause value, where such mapping may be defined specific to the access category of one specific connected remote WTRU (e.g., with the highest/lowest access category).

Regarding network preference/configuration, for example, the network may change the mapping using SIB/RRC signaling. For example, the relay WTRU may receive the explicit mapping or mappings to be applied from the network. For example, the relay WTRU may receive a preference indication (e.g., in SIB or RRC signaling, or another logically equivalent message), which may indicate that the relay WTRU should use a first mapping over a second mapping.

Regarding measurements of sidelink (e.g., CBR, CR, SL RSRP and/or resource load at the relay), for example, the relay WTRU may change the mapping (or determine the mapping) based on measurements of the sidelink channel, such as measurements of CBR, measurements of CR, or measurements of relay load.

In some embodiments, a relay WTRU may determine the resume cause for its own resume procedure based on the access identity of the remote WTRU. A relay WTRU may receive the access identity of the remote WTRU from the remote WTRU itself, for example, in PC5-RRC signaling, SL MAC CE, adaptation layer header or control PDU, or other logically equivalent SL signaling. Similarly, a relay WTRU may determine the access identity based on knowledge of whether the remote WTRU requests an emergency service. Alternatively, or additionally, the relay WTRU may receive the access identity of the remote WTRU from the network (e.g., in dedicated RRC signaling). A remote WTRU may send the access identity to connected relay WTRU upon establishment of a Uu connection via the relay. Alternatively, or additionally, the remote WTRU may send the access identity following mobility (e.g., reselection and PC5-RRC connection to a new relay or connected mode mobility from direct (over Uu) link). A remote WTRU may trigger an SL transmission to the relay WTRU upon change of access identity while connected to the relay WTRU.

The relay WTRU may use the access identity of the remote WTRU when determining its establishment cause when the relay WTRU is in RRC_INACTIVE mode. Alternatively, or additionally, the relay WTRU may use the access identity of the remote WTRU when determining its establishment cause when the remote WTRU is in RRC_INACTIVE mode. Alternatively, or additionally, the relay WTRU may use the access identity of the remote WTRU when determining its establishment cause only when both the relay WTRU and the remote WTRU are in RRC_INACTIVE mode. The relay WTRU may use the access identity of the remote WTRU when determining its establishment cause when the relay WTRU has received paging for the remote WTRU. Specifically, the relay WTRU may determine whether the I-RNTI of the remote WTRU has been included in the paging message of the remote WTRU to determine whether to use the access identity of the remote WTRU. Specifically, the relay WTRU may make such determination based on whether at least one of the paging records in the paging message received at the PO of the remote WTRU contains an I-RNTI. For example, the relay WTRU may make such determination based on whether the paging message contains an indication of the presence of an I-RNTI for the remote WTRU.

The relay WTRU may determine a period of time (e.g., based on a configuration or pre-configuration) following reception of a paging message intended to the remote WTRU over which it should determine its establishment cause based on the access identity of the remote WTRU. Such behavior may be used if the relay WTRU initiates resume/establishment upon reception of the remote WTRU transmission in response to paging. Alternatively, a relay WTRU in RRC_INACTIVE/RRC_IDLE may initiate a connection establishment/resume immediately upon reception of paging intended for the remote WTRU and may determine the establishment cause using the access identity of the remote WTRU for such connection establishment/resume.

In some embodiments, a relay WTRU may determine its own cause value by considering the cause values of multiple remote WTRUs. Such determination may be performed when the relay WTRU receives multiple simultaneous transmissions from remote WTRUs where each may trigger connection establishment/resume by the relay WTRU. The relay WTRU may determine a worst case establishment cause and, for example, use the highest priority establishment cause of all of the received establishment causes for its own establishment cause. In some embodiments, for example, the relay WTRU may use emergency if at least one remote WTRU indicates emergency. Otherwise, as in some embodiments, the remote WTRU may use a specific cause value (e.g., a new cause value). Alternatively, or additionally, the relay WTRU may be configured/predefined with a table mapping cause values from more than one remote WTRU into a single relay cause value.

For example, the relay WTRU in RRC_IDLE mode may set the establishment cause to emergency if the remote WTRU has an emergency service established and/or the remote WTRU initiates a reestablishment procedure, to highPriorityAccess if the remote WTRU initiates a reestablishment procedure, and/or a new cause value for relay access otherwise. The relay WTRU in RRC_INACTIVE mode may set the establishment cause to emergency if the remote WTRU has an emergency service established and the remote WTRU initiates a reestablishment procedure, to highPriorityAccess if the remote WTRU initiates a reestablishment procedure, to a value determined from the access identity of the remote WTRU if the remote WTRU has received a paging message from the relay WTRU, a to a new cause value for relay access otherwise.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, WTRU, terminal, base station, RNC, or any host computer.

What is claimed is:

1. A wireless transmit/receive unit (WTRU) comprising:
a processor and a transceiver, wherein the processor and the transceiver are configured to:
detect a sidelink radio link failure;
in response to the detection of the sidelink radio link failure, start a first timer based on a first timer value associated with selection of a candidate node, wherein the candidate node is a relay node or a network node;
select the candidate node for a connection reestablishment, wherein the selected candidate node is the relay node;
receive configuration information from at least one of the relay node or the network node, wherein the configuration information at least includes a second timer value associated with a second timer, the second timer being associated with the connection reestablishment;
stop the first timer upon selecting the candidate node;
determine whether the configuration information also includes a third timer value associated with the second timer, wherein the third timer value is to be used for the connection reestablishment when the WTRU is configured as a remote WTRU;
on a condition the configuration information also includes the third timer value, start the second timer using the third timer value upon selecting the candidate node;
on a condition the configuration information does not include the third timer value, start the second timer using the second timer value upon selecting the candidate node; and
transmit a reestablishment request message to the relay node.

2. The WTRU of claim 1, wherein:
the second timer value is associated with the connection reestablishment via the network node.

3. The WTRU of claim 1, the processor and the transceiver further configured to, on a condition the WTRU does not receive a response to the reestablishment request message before expiration of the second timer, enter an idle mode.

4. The WTRU of claim 1, wherein the third timer value is greater than the second timer value.

5. The WTRU of claim 1, wherein the first timer is a T311 timer.

6. The WTRU of claim 1, wherein the second timer is a T301 timer.

7. The WTRU of claim 1, wherein the detection of the sidelink radio link failure includes one or more of: determining a number of consecutive hybrid automatic repeat request (HARQ) discontinuous transmissions (DTXs) performed or determining a number of consecutive retransmissions performed.

8. The WTRU of claim 1, wherein the configuration information comprises at least one system information block (SIB).

9. The WTRU of claim 1, wherein selecting the candidate node for the connection reestablishment includes measuring a signal quality associated with the candidate node.

10. The WTRU of claim 1, wherein selecting the candidate node for the connection reestablishment includes determining a priority associated with the candidate node, measuring a signal quality associated with the candidate node, and determining a zone identifier associated with the candidate node.

11. A method performed by a wireless transmit/receive unit (WTRU), the method comprising:
  detecting a sidelink radio link failure;
  in response to the detection of the sidelink radio link failure, starting a first timer based on a first timer value associated with selection of a candidate node, wherein the candidate node is a relay node or a network node;
  selecting the candidate node for a connection reestablishment, wherein the selected candidate node is the relay node;
  receiving configuration information from at least one of the relay node or the network node, wherein the configuration information at least includes a second timer value associated with a second timer, the second timer being associated with the connection reestablishment;
  stopping the first timer upon selecting the candidate node;
  determining whether the configuration information also includes a third timer value associated with the second timer, wherein the third timer value is to be used for the connection reestablishment when the WTRU is configured as a remote WTRU;
  on a condition the configuration information also includes the third timer value, starting the second timer using the third timer value upon selecting the candidate node;
  on a condition the configuration information does not include the third timer value, starting the second timer using the second timer value upon selecting the candidate node; and
  transmitting a reestablishment request message to the relay node.

12. The method of claim 11, wherein:
  the second timer value is associated with the connection reestablishment via the network node.

13. The method of claim 11, the processor and the transceiver further configured to on a condition the WTRU does not receive a response to the reestablishment request message before expiration of the second timer, enter an idle mode.

14. The method of claim 11, wherein the third timer value is greater than the second timer value.

15. The method of claim 11, wherein the first timer is a T311 timer.

16. The method of claim 11, wherein the second timer is a T301 timer.

17. The method of claim 11, wherein detecting the sidelink radio link failure includes one or more of: determining a number of consecutive hybrid automatic repeat request (HARQ) discontinuous transmissions (DTXs) performed or determining a number of consecutive retransmissions performed.

18. The method of claim 11, wherein the configuration information comprises at least one system information block (SIB).

19. The method of claim 11, wherein selecting the candidate node for the connection reestablishment includes measuring a signal quality associated with the candidate node.

20. The method of claim 11, wherein selecting the candidate node for the connection reestablishment includes determining a priority associated with the candidate node, measuring a signal quality associated with the candidate node, and determining a zone identifier associated with the candidate node.

* * * * *